United States Patent
Yamada

(10) Patent No.: US 10,609,242 B2
(45) Date of Patent: Mar. 31, 2020

(54) IMAGE PROCESSING APPARATUS

(71) Applicant: BROTHER KOGYO KABUSHIKI KAISHA, Nagoya-shi, Aichi-ken (JP)

(72) Inventor: Takafumi Yamada, Aichi (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 16/566,215

(22) Filed: Sep. 10, 2019

(65) Prior Publication Data

US 2020/0007706 A1 Jan. 2, 2020

Related U.S. Application Data

(63) Continuation of application No. 15/839,085, filed on Dec. 12, 2017, now Pat. No. 10,440,211.

(30) Foreign Application Priority Data

Mar. 30, 2017 (JP) ................................. 2017-067351

(51) Int. Cl.
*H04N 1/00* (2006.01)
*H04N 1/44* (2006.01)

(52) U.S. Cl.
CPC ..... *H04N 1/00949* (2013.01); *H04N 1/00244* (2013.01); *H04N 1/00411* (2013.01); *H04N 1/00209* (2013.01); *H04N 1/4413* (2013.01); *H04N 2201/0094* (2013.01)

(58) Field of Classification Search
None
See application file for complete search history.

(56) References Cited

U.S. PATENT DOCUMENTS

| 6,380,951 B1* | 4/2002 | Petchenkine | G06F 3/1204 715/736 |
| 6,483,524 B1* | 11/2002 | Petchenkine | G06F 3/1205 715/763 |
| 6,624,908 B1* | 9/2003 | Petchenkine | G06Q 10/06 358/1.15 |
| 6,642,943 B1 | 11/2003 | Machida | |
| 9,787,875 B2 | 10/2017 | To | |
| 2001/0009018 A1* | 7/2001 | Iizuka | G06F 3/1204 710/11 |

(Continued)

FOREIGN PATENT DOCUMENTS

JP 2014-232946 A 12/2014

*Primary Examiner* — Anh-Vinh T Nguyen
(74) *Attorney, Agent, or Firm* — Merchant & Gould P.C.

(57) ABSTRACT

An image processing apparatus is configured to execute first image data process, second image data process, a first storing process to store process combination information including a first default parameter and a second default parameter, and a combination process. The combination process includes a first obtaining process of obtaining an alternative parameter including at least one of a first alternative parameter and a second alternative parameter, a first combination execution process of executing the first image data process in accordance with the first alternative parameter when the first alternative parameter is obtained, and a second combination execution process of executing the second image data process in accordance with the second alternative parameter when the second alternative parameter is obtained.

22 Claims, 14 Drawing Sheets

(56) References Cited

U.S. PATENT DOCUMENTS

| | | | |
|---|---|---|---|
| 2003/0214684 A1 | 11/2003 | Kuboki | |
| 2004/0193880 A1* | 9/2004 | Walmsley | B41J 2/04505 713/168 |
| 2005/0185225 A1* | 8/2005 | Brawn | H04N 1/00403 358/401 |
| 2005/0216649 A1 | 9/2005 | Yoshida | |
| 2006/0114498 A1* | 6/2006 | Yanagi | H04N 1/00209 358/1.15 |
| 2006/0126110 A1* | 6/2006 | Ohara | H04N 1/00209 358/1.15 |
| 2006/0143286 A1* | 6/2006 | Aoki | H04N 1/00209 709/220 |
| 2007/0002373 A1* | 1/2007 | Yamada | G06F 3/1204 358/1.15 |
| 2007/0046976 A1 | 3/2007 | Kasatani | |
| 2007/0046988 A1 | 3/2007 | Kasatani | |
| 2007/0079363 A1* | 4/2007 | Itoh | H04N 1/44 726/5 |
| 2007/0245345 A1* | 10/2007 | Yamada | G06F 9/453 717/174 |
| 2008/0120614 A1* | 5/2008 | Yamada | G06F 8/61 717/175 |
| 2008/0130044 A1* | 6/2008 | Yamada | H04N 1/32133 358/1.15 |
| 2008/0276113 A1 | 11/2008 | Tabeta | |
| 2009/0006989 A1 | 1/2009 | Park | |
| 2009/0172811 A1 | 7/2009 | Homma | |
| 2010/0033744 A1 | 2/2010 | Maeda | |
| 2010/0042987 A1* | 2/2010 | Yamada | G06F 9/4415 717/174 |
| 2010/0079786 A1* | 4/2010 | Yamada | G06F 3/1204 358/1.14 |
| 2010/0306843 A1 | 12/2010 | Okada et al. | |
| 2011/0128575 A1 | 6/2011 | Iwata | |
| 2012/0062921 A1 | 3/2012 | Nakamake | |
| 2012/0062937 A1 | 3/2012 | Kirihara | |
| 2012/0127502 A1 | 5/2012 | Kim | |
| 2013/0060918 A1* | 3/2013 | Butler | H04L 67/025 709/220 |
| 2013/0120769 A1 | 5/2013 | Kakutani | |
| 2014/0071504 A1 | 3/2014 | Kuno | |
| 2016/0092146 A1 | 3/2016 | Adachi | |
| 2017/0013166 A1 | 1/2017 | Katsuyama | |
| 2017/0208206 A1 | 7/2017 | Iguchi | |
| 2018/0288262 A1* | 10/2018 | Yamada | H04N 1/00949 |
| 2019/0098153 A1 | 3/2019 | Hayashi | |
| 2019/0210052 A1* | 7/2019 | Baker | B41J 2/04581 |

* cited by examiner

| SCAN SETTING | SCAN RESOLUTION | SCAN COLOR SETTING | DATA TYPE | THE NUMBER OF PAGES |
|---|---|---|---|---|
| Y1 | 600dpi | MONOCHROMATIC | DOCUMENT | ONE |
| Y2 | 1200dpi | COLOR | NON-DOCUMENT | ONE |
| Y3 | 1200dpi | COLOR | NON-DOCUMENT | PLURAL |
|  |  |  |  |  |

FIG. 10

| STORAGE SETTING | STORAGE DESTINATION | DATA TYPE |
|---|---|---|
| Z1 | SERVER 1 | DOCUMENT |
| Z2 | SERVER 2 | DOCUMENT |
| Z3 | LOCAL MEMORY | NON-DOCUMENT |
|  |  |  |

FIG. 11

| | INPUT DATA INFORMATION | FIRST ALTERNATIVE PARAMETER |
|---|---|---|
| | DATA TYPE | SCAN RESOLUTION |
| SCAN RULE 1 | DOCUMENT | 600dpi |
| | NON-DOCUMENT | 1200dpi |

FIG. 12

| | FIRST ALTERNATIVE PARAMETER | SECOND ALTERNATIVE PARAMETER |
|---|---|---|
| | SCAN RESOLUTION | STORAGE DESTINATION |
| SCAN RULE 2 | 600dpi | SERVER |
| | 1200dpi | LOCAL MEMORY |

FIG. 13

| | INPUT DATA INFOMATION | SECOND ALTERNATIVE PARAMETER |
|---|---|---|
| | DATA TYPE | PRINT RESOLUTION |
| PRINT RULE 1 | DOCUMENT | 600dpi |
| | NON-DOCUMENT | 1200dpi |

FIG. 14

| | FIRST ALTERNATIVE PARAMETER | SECOND ALTERNATIVE PARAMETER |
|---|---|---|
| | SCAN COLOR SETTING | PRINT COLOR SETTING |
| PRINT RULE 2 | COLOR | COLOR PRINTING |
| | MONOCHROMATIC | MONOCHROMATIC PRINTING |

FIG. 15

| | FIRST ALTERNATIVE PARAMETER | SECOND ALTERNATIVE PARAMETER |
|---|---|---|
| | THE NUMBER OF PAGES | ONE-SIDE/BOTH-SIDE PRINT SETTING |
| PRINT RULE 3 | ONE | ONE-SIDE PRINTING |
| | PLURAL | BOTH-SIDE PRINTING |

FIG. 16

| | INPUT DATA INFOMATION | SECOND ALTERNATIVE PARAMETER |
|---|---|---|
| | DATA TYPE | STORAGE DESTINATION |
| STORAGE RULE 1 | DOCUMENT | SERVER 1 |
| | NON-DOCUMENT | LOCAL MEMORY |

FIG. 17

| | WORKFLOW NAME | EXECUTION ORDER | USER ID INFORMATION |
|---|---|---|---|
| WF1 | COPY | SCAN (Y1) →PRINT (X1) | AAAA |
| WF2 | SERVER TRANSMISSION | SCAN (Y1) →STORE (Z2) | BBBB |
| WF3 | DATA STORAGE | SCAN (Y3) →STORE (Z3) | CCCC |

FIG. 18

|  251  | |
|---|---|
| FIRST DEFAULT PARAMETER | SECOND DEFAULT PARAMETER |
| 600dpi | |

FIG. 19A

| FIRST ALTERNATIVE PARAMETER | SECOND ALTERNATIVE PARAMETER | 262 |
|---|---|---|
| | LOCAL MEMORY | |

FIG. 19B

| 271 | 272 |
|---|---|
| FIRST RUNTIME PARAMETER | SECOND RUNTIME PARAMETER |
| 600dpi → 1200dpi | LOCAL MEMORY |

FIG. 19C

| COMBINATION TABLE | T12 |
|---|---|
| 600dpi | SERVER |
| 1200dpi | LOCAL MEMORY |

| FIRST DEFAULT PARAMETER | SECOND DEFAULT PARAMETER |
|---|---|
|  | 600dpi |

| FIRST ALTERNATIVE PARAMETER | SECOND ALTERNATIVE PARAMETER |
|---|---|
| NON-DOCUMENT |  |

FIG. 20C

| FIRST RUNTIME PARAMETER | SECOND RUNTIME PARAMETER |
|---|---|
| NON-DOCUMENT | 600dpi → 1200dpi |

| COMBINATION TABLE | |
|---|---|
| DOCUMENT | 600dpi |
| NON-DOCUMENT | 1200dpi |

IMAGE PROCESSING APPARATUS

CROSS-REFERENCE TO RELATED APPLICATIONS

This application is a continuation of U.S. patent application Ser. No. 15/839,085, filed Dec. 12, 2017, which further claims priority under 35 U.S.C. § 119 from Japanese Patent Application No. 2017-067351 filed on Mar. 30, 2017. The entire subject matter of both applications are incorporated herein by reference.

BACKGROUND

Technical Field

The present disclosures relate to an image processing apparatus.

Related Art

There has been known an image processing apparatus configured to store a plurality of pieces image data preprocessing and a plurality of parameters respectively corresponding to the plurality of image data processes as a combination process, and execute the image data process corresponding to the image data in accordance with the stored combination process has been known.

SUMMARY

The image data processes includes various processes such as a printing process to print object image data, a scanning process, a storing process, an email process and the like. If a user operation to execute respective image data processes, and a user operation procedure to store the combination processes are largely different from each other, the user need to take time to memorize both user operations. Further, when the user desires a combination process which is different from the stored combination process only by partial parameters, the user need to perform the user procedure to store the combination processes from the beginning, which would not achieve high convenience.

According to aspects of the disclosures, there is provided an image processing apparatus, having a controller, a user interface, a memory, and a plurality of kinds of image data processing hardware. The controller is configured to cause the image processing apparatus to in response to receipt of an execution operation through the user interface, cause image data processing hardware corresponding to image data process identified by the execution operation to execute the image data process identified by the execution operation in accordance with a parameter identified by the execution operation, store process combination information, which includes first identifying information indicating first image data process, second identifying information indicating second image data process, a first default parameter, and a second default parameter, in the memory, the first image data process being image data process identified by a first execution operation of the execution operation and being process of preparing image data, the second image data process being the image data process identified by a second execution operation of the executed operation which is different from the first execution operation and being an operation using the image data prepare in the first image data operation as a process object, the first default parameter being a parameter corresponding to the first image data process and being a parameter identified by the first execution operation, the second default parameter being a parameter corresponding to the second image data process and being a parameter identified by the second execution operation, and in response to receive a combination execution operation through the user interface, execute a combination process of causing the first image data processing hardware to execute the first image data process indicated by the first identification information included in the process combination information stored in the memory, and causing the second data processing hardware to execute the second image data process indicated by the second identification information using the image data prepared in the first image data process as object image data. The combination process includes a first obtaining process of obtaining an alternative parameter during the combination process, the alternative parameter including at least one of a first alternative parameter corresponding to the first image data process and a second alternative parameter corresponding to the second image data process, a first combination execution process of causing the first image data processing hardware to execute the first image data process in accordance with the first alternative parameter when the first alternative parameter is obtained in the first obtaining process and causing the first image data processing hardware to execute the first image data process in accordance with the first default parameter when the first alternative parameter is not obtained in the first obtaining process, and second combination execution process of causing the second image data processing hardware to execute the second image data process in accordance with the second alternative parameter when the second alternative parameter is obtained in the first obtaining process and causing the second image data processing hardware to execute the second image data process in accordance with the second default parameter when the second alternative parameter is not obtained in the first obtaining process.

BRIEF DESCRIPTION OF THE ACCOMPANYING DRAWINGS

Figures 8, 9:
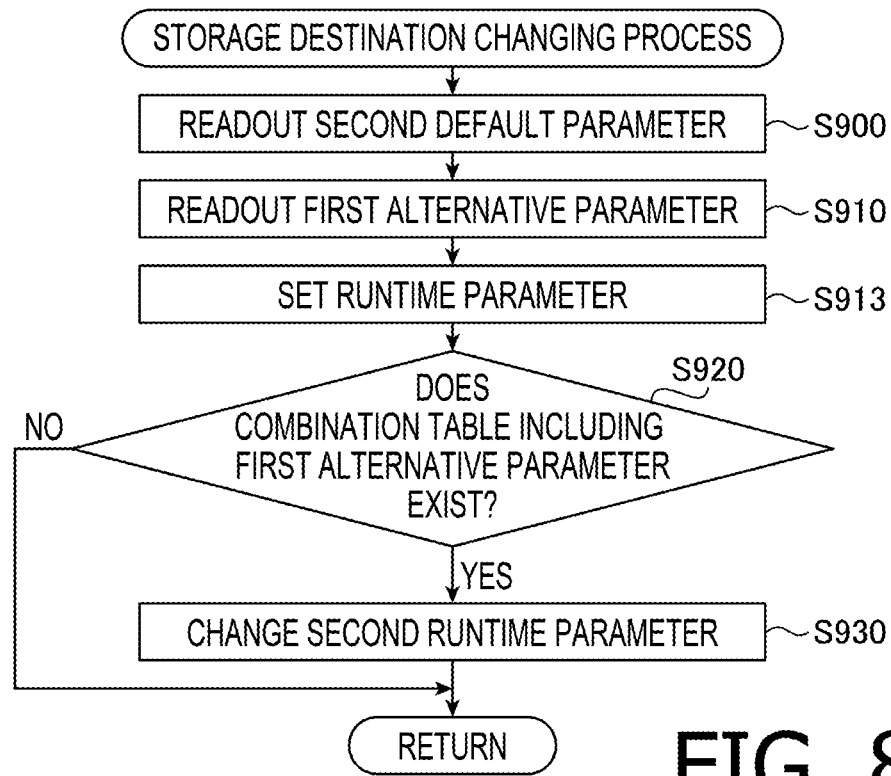
FIG. 8 is a flowchart illustrating a storage destination changing process of the MFP according to the illustrative embodiment.

FIG. 9 schematically shows an example of a parameter table of the print settings.

FIG. 10 schematically shows an example of a parameter table of the scan settings.

FIG. 11 schematically shows an example of a parameter table of the storage settings.

FIGS. 12-17 schematically show examples of a combination table.

FIG. 18 schematically shows an example of a table indicating workflows.

FIGS. 19A-19D graphically represent a process of setting runtime parameters.

FIGS. 20A-20D graphically represent another process of setting the runtime parameters.

FIGS. 21A-21D graphically represent another process of setting the runtime parameters.

DETAILED DESCRIPTION OF THE EMBODIMENT

Figure 1:
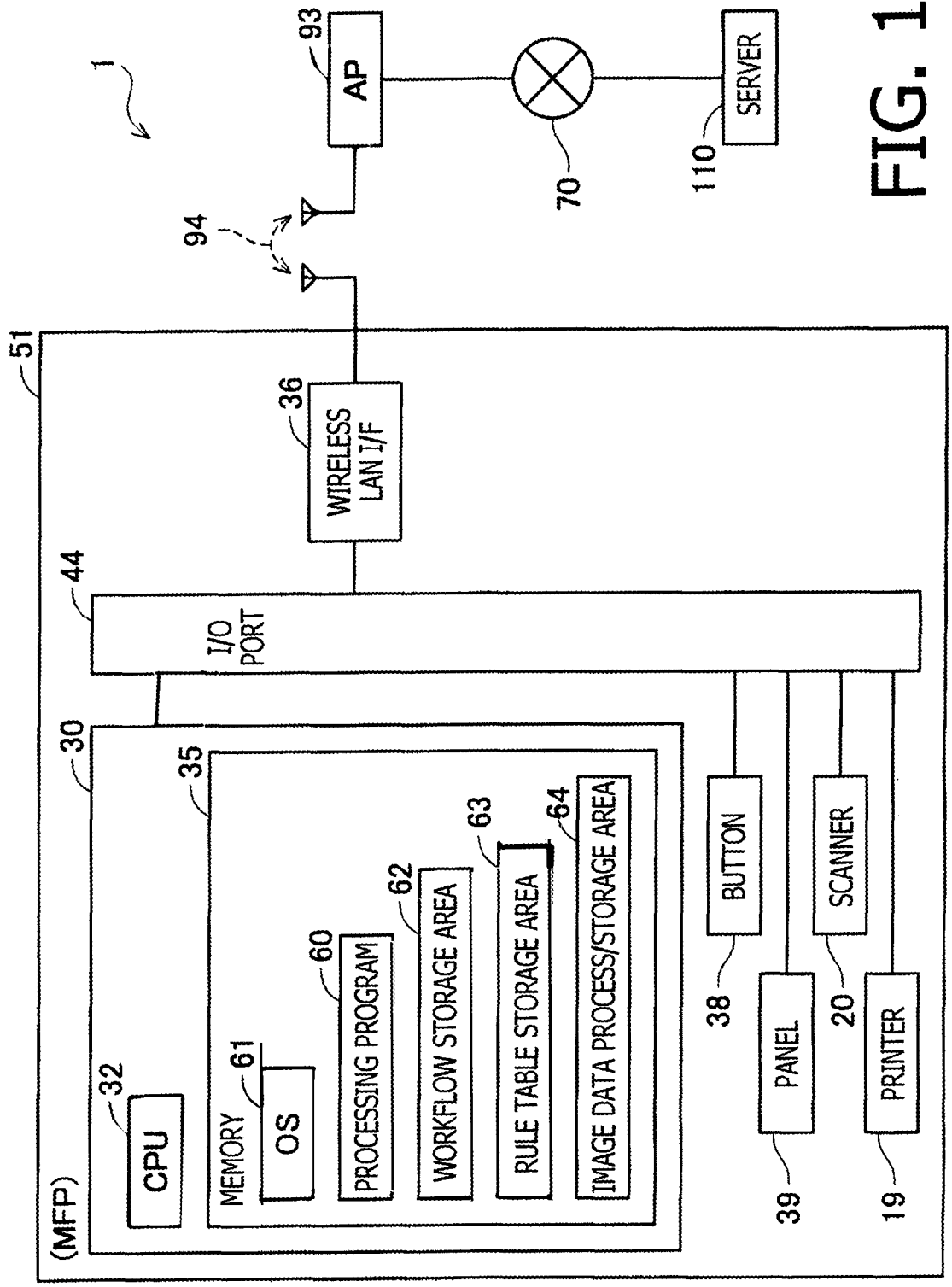
FIG. 1 is a block diagram showing a system configuration of a communication system according to an illustrative embodiment of the present disclosures.

FIG. 1 is a block diagram of a communication system 1 according to an illustrative embodiment of the present disclosures. The communication system 1 has an MFP 51, an AP 93 and a server 110. The AP 93 is a wireless LAN access point. The server 110 is configured to communicate with the MFP 51 through the Internet 70 and the AP 93.

The MFP 51 mainly has a printer 19, a scanner 20, a controller 30, a wireless LAN I/F 36, operation buttons 38 and a panel 39. Such components of the MFP 91 are configured to communicate with each other through an I/O port 44. The controller 30 has a CPU 32 and a memory 35 connected through a bus. The memory 35 is configured to store programs and various pieces of data. The memory 35 may be configured by an HDD, a flash memory, a RAM, a ROM, a buffer and the like. The CPU 32 is configured to execute the programs stored in the memory 35.

The memory 35 stores processing programs 60 and an OS 61. Further, the memory 35 includes a workflow storage area 62, a rule table storage area 63, and an image data process/storage area 64. The processing programs 60 are programs to be executed by the CPU 32, and for storing and reproducing the workflows. The OS 61 is a program controlling an entire operation of the MFP 51. The workflow storage area 62 is an area configured to store process combination information registered by the user. The rule table storage area 63 is an area configured to store particular image data process (e.g., the printing process, the scanning process, and etc.) and parameters associated with the particular image data process. The image data process/storage area 64 is an area configured to store the parameters used in the image data process having been executed. It is noted that the memory 35 may be a computer-readable storage medium. The computer-readable storage medium is a non-transitory medium. Examples of the non-transitory medium are, besides the above example, a CD-ROM, a DVD-ROM and the like. Further, the non-transitory medium is also a tangible medium. In contrast, an electric signal carrying programs downloaded from a server on the Internet is a computer-readable signal medium which is considered to be a kind of computer-readable media, but not categorized in the computer-readable storage medium.

The wireless LAN I/F 36 is configured to perform a wireless communication 94 (see FIG. 1) with the AP 93. The buttons 38 are operable keys/buttons to be operated to execute various functions of the MFP 51. It is noted that the buttons 38 may be integrally formed with the panel 39 as a touch panel. The panel 39 is configured to display various images. The CPU 32 receives user operations with respect to the displayed image through the buttons 38. The printer 19 is configured to print images on printing sheets. The scanner 20 is configured to scan an image on an original sheet with a CCD sensor or CIS sensor and generate image data representing the scanned image.

An operation of the MFP 51 will be described with reference to flowcharts shown in FIGS. 2-8. It is noted that the flowcharts shown in the drawings basically illustrate processes performed by the CPU 32 in accordance with instructions described in the programs. Therefore, terms "determine", "select", "calculate", "identify", "control" and the like, which are used in description of the processed indicate operations performed by the CPU 32. It is also noted that the operation performed by the CPU 32 include controlling of hardware through the OS 61. Further, the term "data" used throughout the specification is represented by a computer-readable bit string. Further, a plurality of pieces of data having different formats but containing substantially the same contents/meanings will be regarded as the same data. Similarly, a plurality of pieces of information having different formats but containing substantially the same contents/meanings will be regarded as the same information.

Figure 2:
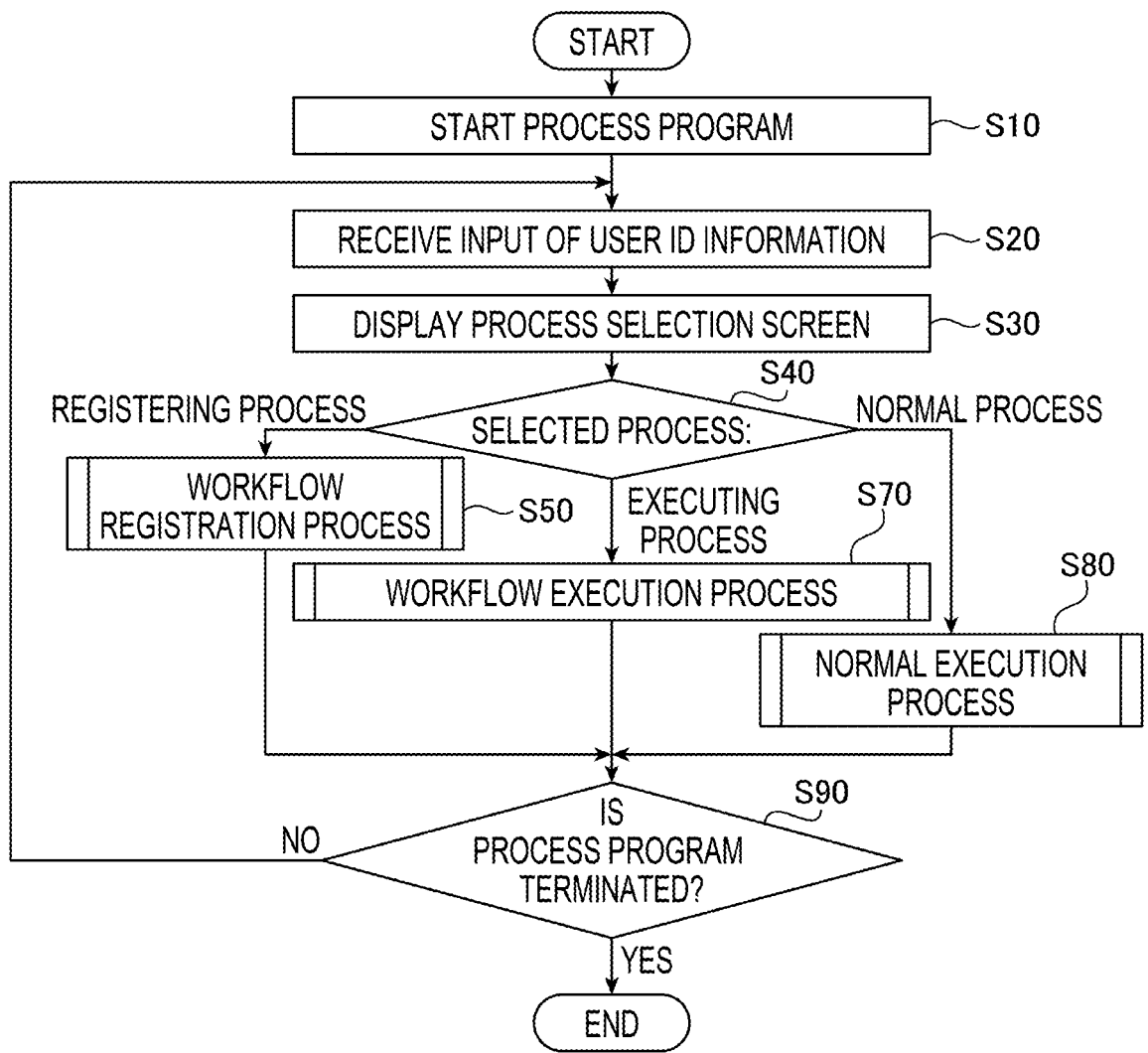
FIG. 2 is a flowchart illustrating a main process of an MFP according to the illustrative embodiment.
Figure 3:
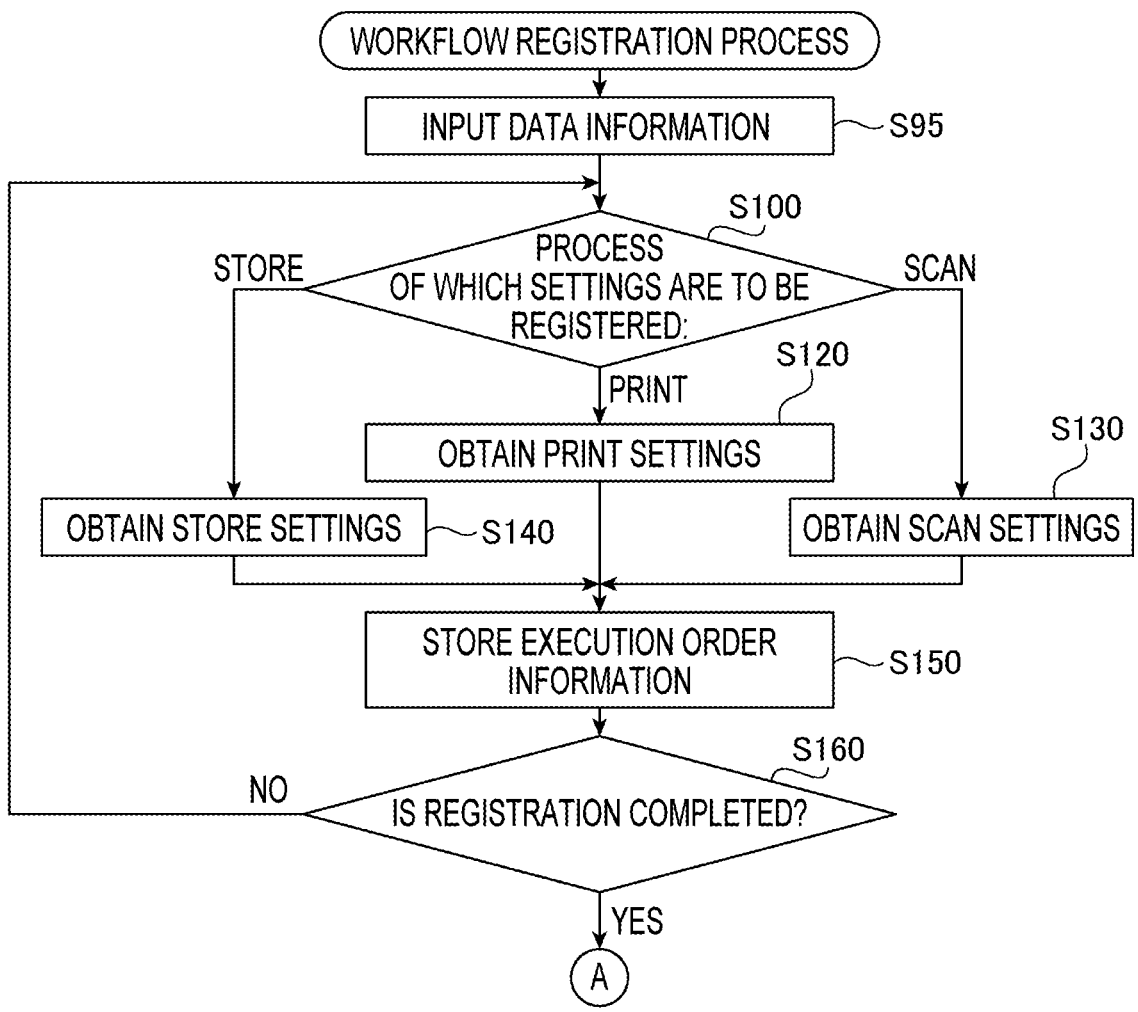
FIGS. 3 and 4 show a flowchart illustrating a workflow registration process of the MFP according to the illustrative embodiment.
Figure 4:
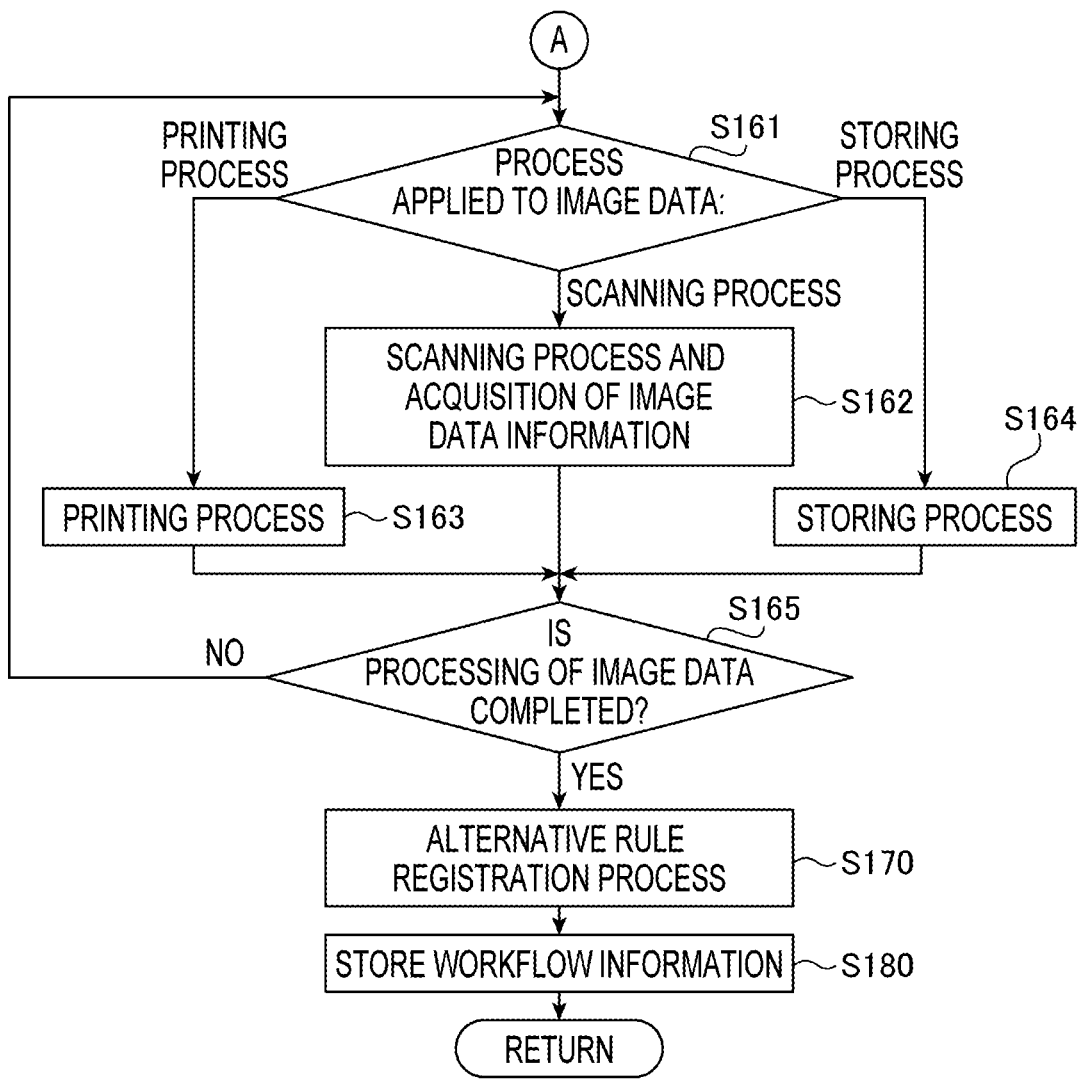

When the user inputs an operation to start up the processing program 50 through a particular one of the buttons 38 (FIG. 2: S10), the CPU 32 starts up the processing program 60 under control of the OS 61.

In S20, the CPU 32 receives user ID information to discriminate the user who has input the operation to start up the processing program 60 in S10. The user ID information is, for example, the user's name. Specifically, the CPU 32 displays an image screen encouraging the user to input the user's name on the panel 30, and receives the user input of the user's name, thereby obtaining the user ID. It is noted that the name may be a full name, or only a first name or a family name. Further, the user ID information needs not be limited to the user's name, but may be another ID only for discriminating a user from the others.

In S30, the CPU 32 displays an image screen to acquiring user input to select a process to be performed on the panel 39. Specifically, the CPU 32 displays, for example, an image contains character strings such as "Workflow Registration Process", "Workflow Execution Process", "Normal Execution Process" and the like.

In S40, the CPU 32 identifies the process of which the selection input is received. When it is determined that the "Workflow Registration Process" has been selected (S40: REGISTRATION PROCESS), the CPU 32 advances the control to S50. When it is determined that the "Workflow Execution Process" has been selected (S40: EXECUTING PROCESS), the CPU 32 advances the control to S70. When it is determined that the "Normal Execution Process" has been selected (S50: NORMAL PROCESS), the CPU 32 advances the control to S80.

When the "Workflow Registration Process" is selected (S40: REGISTRING PROCESS), the CPU 32 executes the workflow registration process in S50. The workflow registration process is performed as the CPU 32 executes a subroutine shown in FIG. 3.

When the workflow registration process is started, the CPU 32 obtains input data information. Specifically, the CPU 32 displays selectable alternatives (i.e., "DOCUMENT" and "NON-DOCUMENT") of data types of the image data which is a process object on the panel 39, and receives the user operation to select one of the alternatives. For example, when the alternative "DOCUMENT" is selected, the CPU 32 stores the input data information representing the "DOCUMENT" as a scan setting Y1 as shown in area R3 in FIG. 10. It is noted that "DOCUMENT" is information indicating that the process object is document image data including an image of character strings. Similarly, as shown in area R6 in FIG. 9, the CPU 32 stores "DOCUMENT" as print setting X1, and store "DOCU- MENT" as storage setting Z1 as shown in R7 in FIG. 11. Tables T1-T3 are tables storing print settings, scan settings and storage settings, respectively, and are stored in the image data process/storage area 64.

In S100, the CPU 32 determines which settings of the image data processes are to be registered. For example, the CPU 32 displays a screen allowing the user to select one of the image data processes of which settings are to be registered on the panel 39, receives input of the user operation to select one of the image data processes, and determines which of the image data processes has been selected by the user. When the image data process selected by the user is the printing process (S100: PRINT), the CPU 32 advances the control to S120. When the selected process is the scanning process (S100: SCAN), the CPU 32 advances the control to S130. When the selected process is the storing process (S100: STORE), the CPU 32 advances the control to S140.

In S130, the CPU 32 obtains the scan settings. Concretely, for example, the CPU 32 obtains a scan resolution 212 and a scan color 213 of the image which is a process object, and stores the same in the table T2 as shown in FIG. 10. According to the illustrative embodiment, as indicated in area R2 of the table T2 shown in FIG. 10, the CPU 32 obtains, as the scan setting Y1, "600 dpi" and "MONO-CHROMATIC". As a mode of obtaining the scan setting, for example, the CPU 32 displays a parameter selection screen prompting the user to select parameters of the scan resolution and the scan color, respectively, on the panel 39. Then, the CPU 32 receives input of the user operation to select the respective parameters. Further, the CPU 32 also displays a button to execute registration of the selected settings. In response to input of the user operation with respect to the button, the CPU 32 obtains the parameter which is selected at the time of the user operation as the scan setting, and stores the same in the table T2. It is noted that, in the MFP 51, initial parameters respectively corresponding to the data types "DOCUMENT" and "NON-DOCUMENT" are stored in the memory 35 in advance. The initial parameters are scan parameters and the like, which are set as factory default settings of the MFP 51. In the parameter selection screen described above, the initial parameters corresponding to the data types obtained in S95 are displayed as initial settings. The parameters of the scan setting Y1 as stores may be used as the initial parameters when the selection screen will be displayed from the next time onwards. It is noted that, in the table T2, scan settings Y2 and Y3 which were obtained in the past are stored. So are print settings and storage settings, which will be described later. After execution of S130, the CPU 32 advances the control to S150.

In S120, the CPU 32 obtains the print settings. Concretely, for example, the CPU 32 obtains a print resolution 112, a print color setting 113, a one-side/both-side print setting 114, and stores the same in the table T1 (see FIG. 9). According to the illustrative embodiment, as indicated in area R1 of the table T1 shown in FIG. 9, the CPU 32 obtains, as the print setting X1, "600 dpi", "MONOCHROMATIC", and "ONE-SIDE PRINTING". A mode of obtaining the print setting is, for example, the same as the mode of obtaining the scan setting. It is noted that, in the table T1, print settings X2 and X3 which were obtained in the past are stored. After execution of S120, the CPU 32 advances the control to S150.

In S140, the CPU 32 obtains the storage settings. Concretely, for example, the CPU 32 obtains a print resolution 112, a storage destination 312 of the image data which is the process object and stores the same in the table T3 (see FIG. 11). According to the illustrative embodiment, as indicated in area R4 of the table T3 shown in FIG. 11, the CPU 32 obtains, as the storage setting Z1, "SERVER 1" (e.g., the server 110). A mode of obtaining the storage setting is, for example, the same as the mode of obtaining the scan setting. It is noted that, in the table T3, storage settings Z2 and Z3 which were obtained in the past are stored. After execution of S140, the CPU 32 advances the control to S150.

In S150, the CPU 32 stores execution order information indicating the order of execution of a plurality of data processes in the memory 35. Specifically, the CPU 32 sequentially stores the plurality of data processes corresponding to the settings selected in S100 in a selected order. For example, when the CPU 32 receives the input of user operation to select the scan setting at first execution of S100, the CPU 32 associates the scanning process corresponding to the scan settings with first ordinal data and stores the same. Thereafter, when the CPU 32 receives the input of user operation to select the print setting at second execution of S100, the CPU 32 associates the printing process corresponding to the selected print settings with the second ordinal data and stores the same.

In S160, the CPU 32 determines whether registration of default parameters have been completed. For example, the CPU 32 displays a completion button to terminate acquiring a registration, and a continue button to continuously execute the registration on the panel 39, and determines which of the completion button and the continue button has operated by the user. When it is determined that the completion button has been operated (S160: YES), the CPU 32 returns the control to 1. When it is determined that the continue button has been operated (S160: NO), the CPU 32 returns the control to S100.

In S161 (FIG. 4), the CPU 32 determines what is the content of the image data process among the plurality of data processes. Concretely, the CPU 32 retrieves the execution order information indicating the execution order of the plurality of data processes stored in S150 from the memory 35, and determines which one of the plurality of data processes is to be executed based on the execution order information. When it is determined that the data process to be executed is the scanning process (S161: SCANNING PROCESS), the CPU 32 advances the control to S162. When it is determined that the data process to be executed is the printing process (S161: PRINTING PROCESS), the CPU 32 advances the process to S163. When it is determined that the data process to be executed is the storing process (S161: STORING PROCESS), the CPU 32 advances the control to S164.

In S162, the CPU 32 executes the scanning process and obtains scan data information. The scanning process is a process to generate image data which is the process object. Concretely, the CPU 32 executes the scanning process using the scan settings Y1 (see FIG. 10) obtained in S130. Further, the CPU 32 obtains the number of pages 215 (see FIG. 10) scanned in the scanning process as a first default parameter, and stores the same in the table T2. According to the illustrative embodiment, the CPU 32 obtains "1" as the number of pages 215 of the scan setting Y1, which is indicated in area R5 of the table T2 shown in FIG. 10. It is noted that the number of pages 215 may be obtained by received the input by the user operation. After execution of S162, the CPU 32 advances the control to S165.

In S163, the CPU 32 executes the printing process. The printing process may be an image data process using the image data generated, for example, by the latest scanning process among the scanning processes executed earlier, in the execution order represented by the execution order, than the printing process as the process object. Concretely, the CPU 32 execute the printing process using the print settings X1 (see FIG. 9) obtained in S120. After execution of S163, the CPU 32 advances the control to S165.

In S164, the CPU 32 executes the storing process. The storing process is an image data process using the image data generated in the scanning process, which is in the closest execution order from the execution order of the storing process among the scanning processes executed earlier, in the execution order represented by the execution order information, than the storing process, as the process object). Concretely, the CPU 32 execute the storing process, using the storage settings Z1 (see FIG. 11) obtained in S140, to store the image data in the storage destination indicated by the storage settings Z1. After execution of S164, the CPU 32 advances the control to S165.

It is noted that, regarding the various image data processes described above, when there is a combination of "the scanning process and the printing process" or a combination of "the scanning process and the storing process", the scanning process is an example of first image data process and the printing process or the storing process is an example of the second image data process. Thus, a combination of the processes as above, which exists in a series of a plurality of image data process is an example of a "combined process" referred to in the present specification.

In S165, the CPU 32 determines whether the image data process has completed. Concretely, the CPU 32 determines whether all the image data processes indicated by the execution order information stored in S150 have been executed. When it is determined that all the image data processes have been executed (S165: YES), the CPU 32 advances the control to S170. Otherwise (S165: NO), the CPU 32 returns the control to S161.

In S170, the CPU 32 executes an alternative rule registration process. Concretely, the CPU 32 generates combination tables T11-T16 defining setting rules of the various image data processes (see FIGS. 12-17) based on the parameters obtained in S120-S140, and stores the generated combination tables T11-T16 in the rule table storage area 63. Each of the combination tables T11-T16 indicates a combination of a first alternative parameter and a second alternative parameter corresponding to the first alternative parameter, or a combination of input data information and one of the first or second alternative parameter corresponding to the input data information. It is noted that the first alternative parameter corresponds to a first image data process, and the second alternative parameter corresponds to a second image data process.

For example, according to a scan rule 1 of the combination table T11 (see FIG. 12), based on the scan setting Y1 shown in FIG. 10, the scan rule 1 indicated in area R11 of the combination table T11 is registered as an alternative rule thereof with use of the data type "DOCUMENT" indicated in area R3 and the scan resolution "600 dpi" indicated in area R2 of the table T2.

According to a scan rule 1 of the combination table T13 (see FIG. 14), based on the print setting X1 shown in FIG. 9, the print rule 1 indicated in area R13 of the combination table T13 is registered as an alternative rule thereof with use of the data type "DOCUMENT" indicated in area R6 and the print resolution "600 dpi" indicated in area R1 of the table T1.

According to a storage rule 1 of the combination table T16 (see FIG. 17), based on the storage setting Z1 shown in FIG. 11, the storage rule 1 indicated in area R16 of the combination table T16 is registered as an alternative rule thereof with use of the data type "DOCUMENT" indicated in area R4 and the storage destination "SERVER 1" indicated in area R7 of the table T3.

It is noted that the other setting rules of respective image data processes (e.g., the scan rule indicated in are R12 of the Table T11 shown in FIG. 12) is registered in S170 of the workflow registration process executed in the past. Concretely, the scan rule 1 indicated in area R12 of the table T11 shown in FIG. 12 is registered using a combination of the data type "NON-DOCUMENT" and the scan resolution "1200 dpi" from the scan setting Y2 (see FIG. 10) obtained in S130 of the workflow registration process executed in the past.

When the setting rule registered in S170 conflicts with the setting rule stored in the past, the CPU 32 stored the setting rule in the rule table storage area 63 with overwriting the setting rule stored in the past. For example, if a combination of "DOCUMENT" and "300 dpi" is stored as the scan rule 1, which was registered in the past, and the setting rule based on the scan setting obtained in S130 is a combination of "DOCUMENT" and "600 dpi", the CPU 32 overwrites the scan rule 1 currently stored with the new combination of "DOCUMENT" and "600 dpi", and stores the same in the rule table storage area 63.

In S180, the CPU 32 stored the execution order information indicating the execution order of respective image data processes, the default parameters setting for respective image data processes, and workflow information which is a process-combination information associating the user ID information received in S20 in the workflow storage area 62. At this stage, the CPU 32 displays a screen prompting the user to set a workflow name for discriminating the workflow information from the other pieces of the workflow information on the panel 39, and obtains a workflow name by acquiring the input of the user operation to set the workflow name.

As shown in FIG. 18, there are various pieces of workflow information. For example, there is a workflow WF1 in which a copying function is realized by executing the scanning process as the first image data process, and then the printing process as the second image data process. Further, there is a workflow WF2 in which an image-attached email transmission function is executed by executing the scanning process as the first image data process and executing an email transmission as the second image data process. Still further, there is a workflow WF3 in which an image data storage function is realized by executing the scanning process as the first image data process and the storing process as the second image data process.

As an example, a process of storing the workflow WF1 will be concretely described. The CPU 32 obtains a workflow name "COPY" by acquiring the input of the user operation to set the workflow name. Then, the CPU 32 stores the execution order information, in which the scanning process is associated with respective parameters of the scan setting Y1, and the printing process is associated with respective parameters of the print setting X1, and the user ID information "AAAA" received in S20 are associated with the workflow name "COPY". In a process of storing the workflow WF2, the CPU 32 obtains a workflow name "SERVER TRANSMISSION" similarly to the above. Then, the CPU 32 stores the execution order information, in which the scanning process is associated with respective parameters of the scan setting Y1, and the storing process is associated with respective parameters of the storage setting Z2, and the user ID information "BBBB" received in S20 are associated with the workflow name "SERVER TRANSMIS- SION". The CPU 32 generates the table TWF representing the contents of the workflow information, and stores the thus generated table TWF in the workflow storage area 62. After execution of S180, the CPU 32 terminates the subroutine "Workflow Registration Process" and advanced the control to S90 of FIG. 2.

It is noted that, in the above-described example of the "WORKFLOW REGISTRATION PROCESS", the default parameters are sequentially obtained. However, the aspects of the present disclosures need not be limited to the described configuration. For example, when the default parameter for the print setting has already been stored in the workflow registration process executed in the past, it may be possible to divert the stored parameter. For example, when the workflow registration process is started with the print setting X2 and X3 which were obtained in the past are still stored in the table T1 shown in FIG. 9, by displaying the latest usage one between the setting X2 and X3 as the initial setting, the setting X2 or X3 is diverted to set the print setting X1.

Figure 5A:
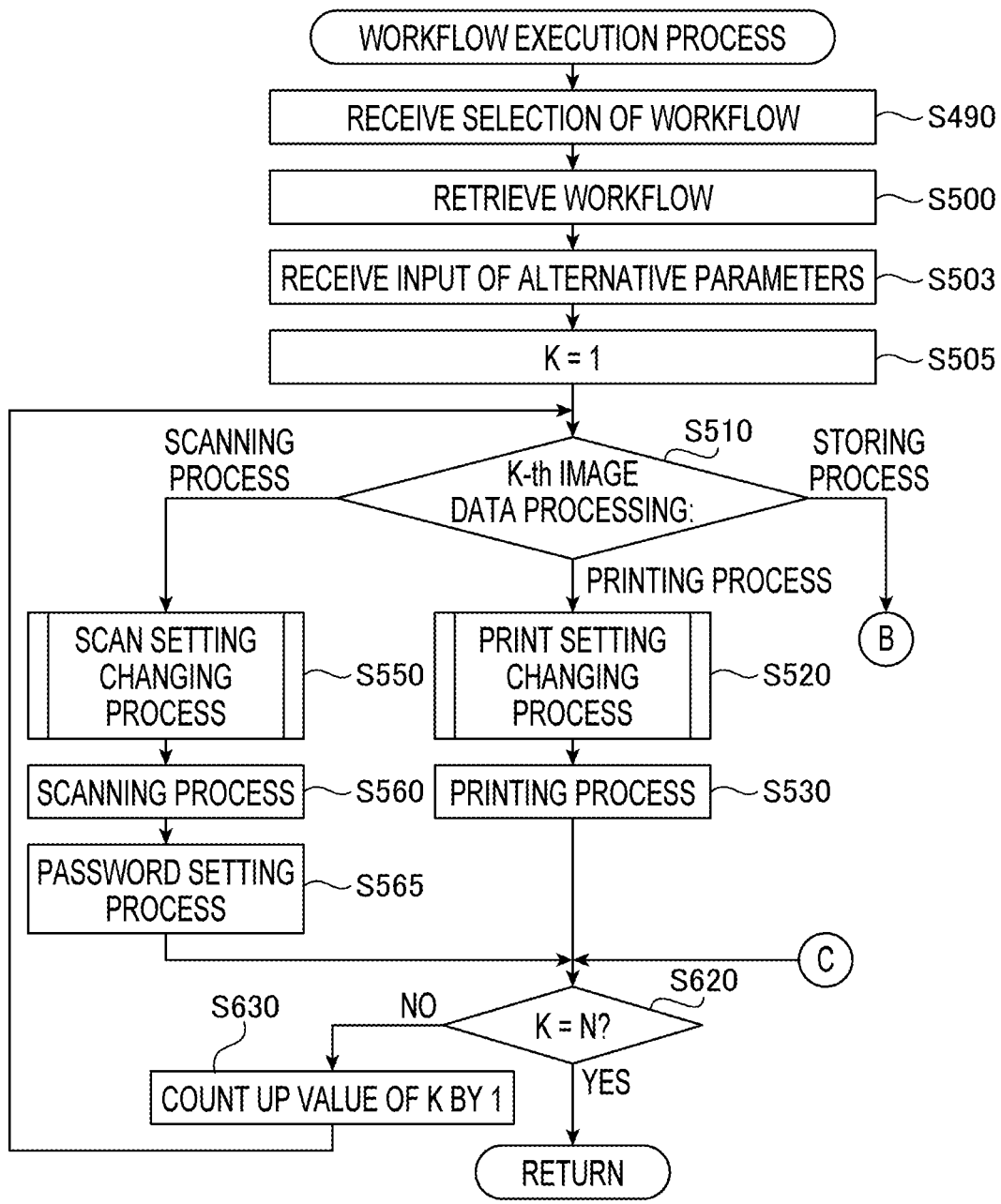
FIGS. 5A and 5B show a flowchart illustrating a workflow execution process of the MFP according to the illustrative embodiment.
Figure 5B:
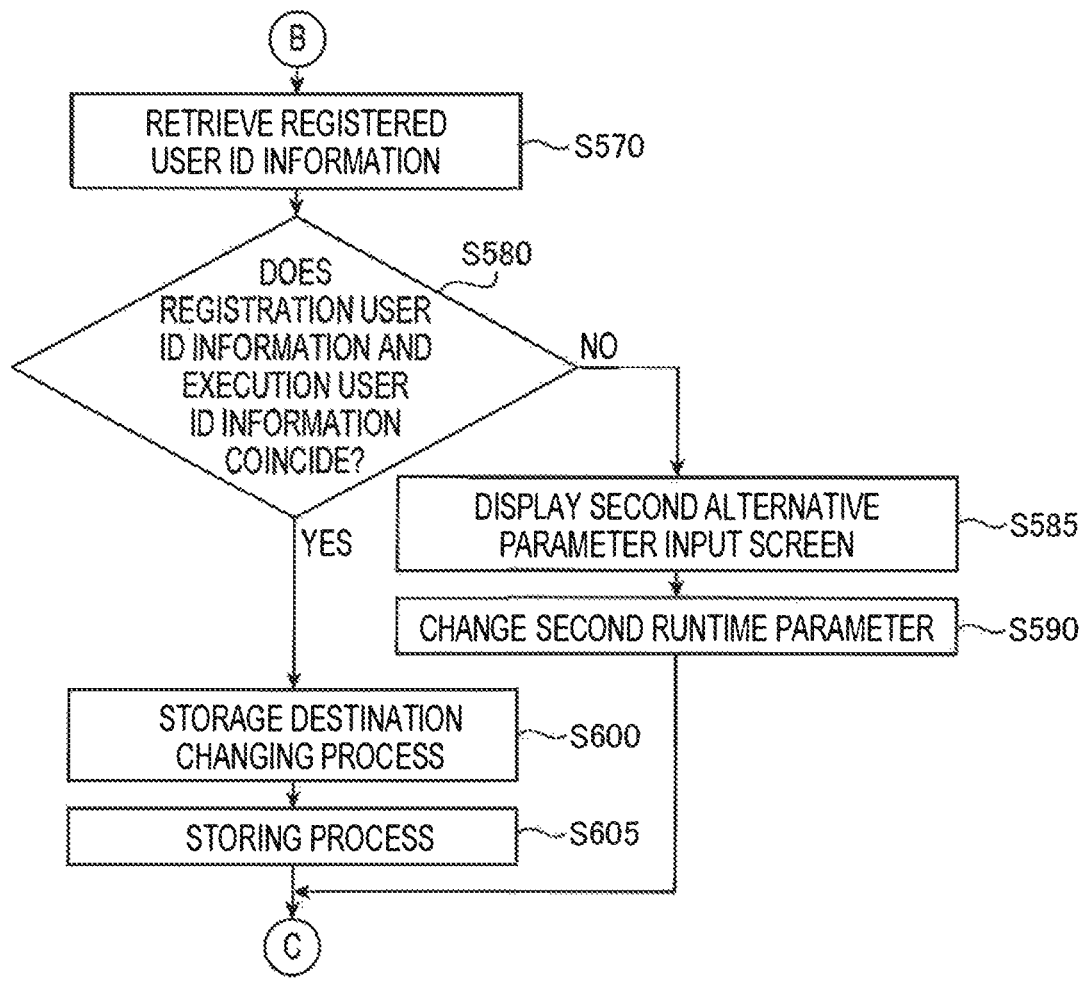

When the workflow execution process is selected in S40, the CPU 32 executes the workflow execution process in S70. FIGS. 5A and 5B show a flowchart of subroutine of the workflow execution process. Hereinafter, the workflow execution process will be described with reference to FIGS. 5A and 5B.

In S490, the CPU 32 receives an input of user operation to select a workflow. For example, the CPU 32 retrieves workflow information (see FIG. 18) which is stored in the workflow registration process from the workflow storage are 62, displays respective workflow names on the panel 39, and receives input of the user operation to select one of the workflow names.

In S500, the CPU 32 retrieves the workflow information selected by the user operation from the workflow storage area 62. In the following description, by executing the selected workflow, it is assumed that N processes (N being an integer greater than one) are sequentially executed.

In S503, the CPU 32 receives input of alternative parameters. That is, in S503, the CPU 32 receives input of the user operation to modify the default parameters. In S503, the CPU 32 displays, on the panel 39, the default parameters, which are set to respective image data processes of the workflow indicated by the retrieved workflow information. Concretely, the CPU 32 displays respective parameters of the scan setting Y1 and the storage setting Z2, which are set to the workflow WF2, on the panel 39, and also displays a parameter change reception image allowing the user to change the parameters. When the input of the user operation to change objective parameters is received, the CPU 32 changes the objective parameters to changed parameters. Further, the CPU 32 also displays an image of a button to complete the operation to change respective parameters. When the input of the user operation with respect to the image of such a button is received, the CPU 32 temporarily stores the objective parameters (i.e., the changed parameters) in the memory 35 as alternative parameters. For example, when the storage setting Z2 shown in FIG. 11 is set as the default parameter, and when the CPU 32 receives the input of the user operation to change "SERVER 2" which is one of the default parameters of the storage destination 312 to "LOCAL MEMORY", the CPU 32 temporarily stores the received setting of the storage destination "LOCAL MEMORY" as the alternative parameter in the memory 35.

In S505, the CPU 32 sets the counter value K to "1". In S510, the CPU 32 determines which of the plurality of image data processes corresponds to a K-th process included on the workflow represented by the retrieved workflow information. When it is determined that the K-th image data process is the printing process (S510: PRINTING PROCESS), the CPU 32 advances the control to S520. When it is determined that the K-th image data process is the scanning process (S510: SCANNING PROCESS), the CPU 32 advances the control to S550. When it is determined that the K-th processing is the storing process (S510: STORING PROCESS), the CPU 32 advances the control to S570.

Figure 6:
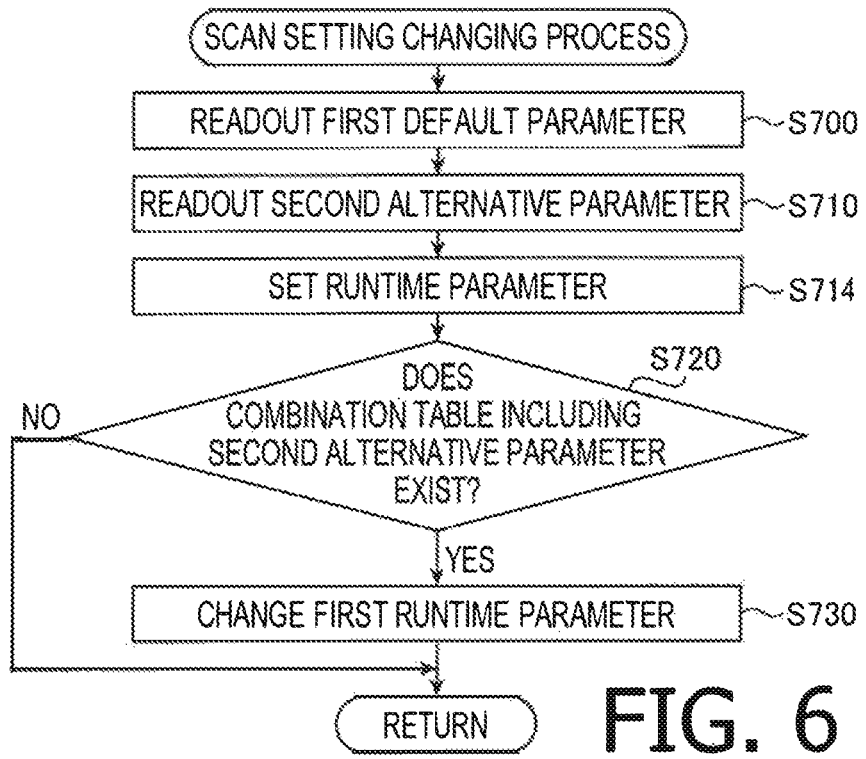
FIG. 6 is a flowchart illustrating a scan setting changing process of the MFP according to the illustrative embodiment.
Figure 7:
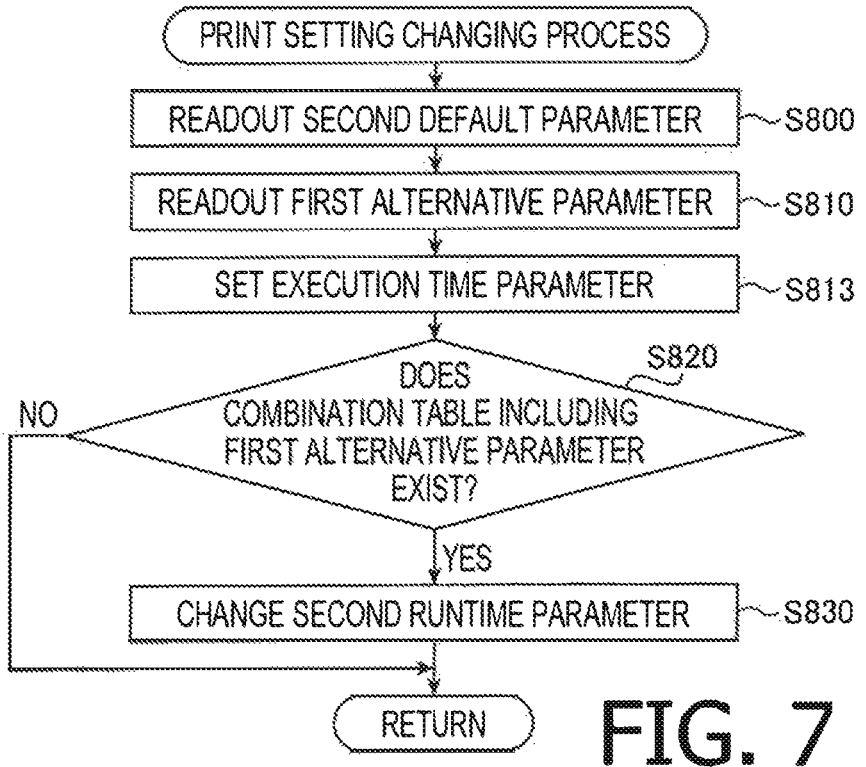
FIG. 7 is a flowchart illustrating a print setting changing process of the MFP according to the illustrative embodiment.

In S550, the CPU 32 executes the scan setting changing process. Specifically, in S550, the scan setting changing process, which is a subroutine shown in FIG. 6 is executed. Hereinafter, the scan setting changing process will be described.

In S700, the CPU 32 retrieves the first default parameter of the scanning process registered in the workflow registration process. The retrieved parameter is temporarily stored in the memory 35. FIGS. 19A-19D, 20A-20D, and 21A-21D show the temporarily stores parameters. For example, FIG. 19A shows a state where the scan resolution "600 dpi" retrieved from the scan setting Y1 in the table T2 shown in FIG. 10 is temporarily stored as the first default parameter.

In S710, the CPU 32 retrieves the second alternative parameter from the memory 35. According to the illustrative embodiment, as shown in FIG. 19A, the CPU 32 retrieves the storage destination "LOCAL MEMORY" which was changed in S503 as the second alternative parameter 262 from the memory 35.

In S714, the CPU 32 sets the runtime parameter by combining the first default parameter and the second alternative parameter. Concretely, regarding the items for which the alternative parameters have been obtained, the alternative parameters are set to the runtime parameters, while times for which the alternative parameters have not been obtained, the default parameters are set to the runtime parameters. According to the illustrative embodiment, as indicated by arrow y1 in FIG. 19C, the obtained second alternative parameter 262 is set to a second runtime parameter 272, and as indicated by arrow y2 in FIG. 19C, the first default parameter 251 is set to a first runtime parameter 271.

In S720, the CPU 32 determines whether there exists a combination table including the second alternative parameter which is temporarily stored in S503. That is, the CPU 32 determines whether there exists a combination table including the retrieved second alternative parameter among the combination tables stored in the rule table storage area 63. When it is determined that there exists the combination table including the retrieved second alternative parameter (S720: YES), the CPU 32 advances the control to S730. When it is determined that there does not exist a combination table including the retrieved second alternative parameter (S720: NO), the CPU 32 terminates the subroutine "SCAN SETTING CHANGING PROCESS" shown in FIG. 6, and advances the control to S560 (FIG. 5A). According to the illustrative embodiment, as indicated by arrow y3 in FIG. 19D, there exists a combination table T12 including the storage destination "LOCAL MEMORY" (i.e., the combination table T12 shown in FIG. 13), decision in S720 is affirmative.

In S730, the CPU 32 changes the first runtime parameter set in S713 in accordance with the combination table containing the second alternative parameter. Concretely, the CPU 32 changes the first runtime parameter 271 which is set to "600 dpi" in S713 to "1200 dpi" as indicated by arrow y4 in FIGS. 19C and 19D, in accordance with the combination table T12 shown in FIG. 19D. After execution of S730, the CPU 32 terminates the "SCAN SETTING CHANGING PROCESS" shown in FIG. 6, and advances the control to S560 (FIG. 5A). It is noted that, in the "SCAN SETTING CHANGING PROCESS" described above, the storage destination is used as the second runtime parameter and the scan resolution is used as the first runtime parameter. It is only an example and other parameters (e.g., the scan color setting) may also be used in a similar manner.

In S560, the CPU 32 executes the scanning process. It is noted that, at this stage, the scanning process is executed in accordance with the runtime parameter set in the scan setting changing process described above.

In S565, the CPU 32 executes a password setting process. Concretely, the CPU 32 analyzes the image data generated by the scanning process executed in S560, and if the generated image data includes an image of a particular character string indicating confidentiality, the CPU 32 displays a screen receiving the input of the user operation to set a password on the panel 39. Then, as the input of the user operation to set the password is received, the CPU 32 sets the password to the image data. The image of the particular character string is, for example, an image of a character string "confidential". It is noted that, when it is determined that the image of the particular character string is not includes as a result of analysis of the image data, a process of S565 may be omitted. After execution of S565, the CPU 32 advances the control to S620.

When it is determined, in S510, that the K-th image data process is the printing process (S510: PRINTING PROCESS), the CPU 32 advances the control to S520. In S520, the CPU 32 executes the "PRINT SETTING CHANGING PROCESS" which is a subroutine shown in FIG. 7. Hereinafter, the "PRINT SETTING CHANGING PROCESS" will be described.

In S800, the CPU 32 retrieves the second default parameter for the printing process registered in the workflow registration process. For example, as shown in FIG. 20A, the CPU 32 retrieves "600 dpi" as the second default parameter 152. It is noted that the second default parameter 152 is retrieved from the print resolution 112 of the print setting X1 in the table T1 shown in FIG. 9.

In S810, the CPU 32 retrieves the first alternative parameter from the memory 35. For example, as shown in FIG. 20B, the CPU 32 retrieves the data type "NON-DOCUMENT" which was changed in S503 as the first alternative parameter 161 from the memory 35.

In S813, the CPU 32 sets the runtime parameter by combining the second default parameter and the first alternative parameter. Setting of the runtime parameter shown in FIGS. 20A-20D is similar to that in S713 described above.

In S820, the CPU 32 determines whether there exists a combination table including the first alternative parameter which is temporarily stored in S503. It is noted that the process in S820 is similar to the process executed in S720. When there exists the combination table including the first alternative parameter (S820: YES), the CPU 32 advances the control to S830. When there does not exist a combination table including the first alternative parameter (S820: NO), the CPU 32 advances the control to S530 (FIG. 5A). According to the illustrative embodiment, since there exists the combination table T13 shown in FIG. 20D including the data type "NON-DOCUMENT" (i.e., there exists the combination table T13 which is show in FIG. 14), the determination in S820 is affirmative.

In S830, the CPU change the second runtime parameter set in S813 in accordance with the combination table including the first alternative parameter. Changing of the second runtime parameter is similar to changing of the first runtime parameter in S730. After execution of S830, the CPU 32 terminates the subroutine of "PRINT SETTING CHANGING PROCESS" shown in FIG. 7, and advances the control to S530 (FIG. 5A). In the above-described example of "PRINT SETTING CHANGING PROCESS", the data type is used as the first runtime parameter, and the print resolution is used as the second runtime parameter. It is noted that operations are basically similar in a case where other parameters (e.g., scan color setting, print color setting).

In S530, the CPU 32 executes the printing process. It is noted that the printing process is executed in accordance with the runtime parameter set in the print setting changing process described above.

When it is determined that the K-th image data process is the storing process (S510: STORING PROCESS), the CPU 32 advances the control to S570 (FIG. 5B). In S570, the CPU 32 retrieves the user ID information which is stored in association with the selected workflow.

In S580, the CPU 32 determines whether the retrieved user ID information and the user ID information received in S20 coincide with each other. When it is determined that both ID's coincide (S580: YES), the CPU 32 advances the control to S600. When it is determined that both ID's do not coincide with each other (S580: NO), the CPU 32 advances the control to S585.

In S585, the CPU 32 displays an input screen of the second alternative parameter indicating the storage destination of the process object image data on the panel 39. Then, in response to receipt of the user operation to input the storage destination through the panel 39, the CPU 32 obtains the second alternative parameter.

In S590, the CPU 32 sets the runtime parameter by combining the first default parameter and the input second alternative parameter. After execution of S590, the CPU 32 advances the control to S620.

When it is determined that the retrieved user ID information and the user ID information received in S20 coincide with each other (S580: YES), the CPU 32 advances the control to S600. In S600, the CPU 32 executes a "STORAGE DESTINATION CHANGING PROCESS". Concretely, a subroutine of the "STORAGE DESTINATION CHANGING PROCESS" is shown in FIG. 8, which will be described in detail.

Figure 21A:
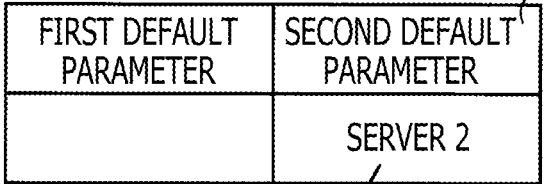

In S900, the CPU 32 retrieves the first default parameter of the storing process registered in the workflow registration process. For example, as shown in FIG. 21A, the CPU 32 retrieves the "SERVER 2" as the first default parameter 352. It is noted that the first default parameter 352 is retrieved from the storage destination 312 indicated by the storage setting Z2 in the table T3 shown in FIG. 11.

Figure 21B:
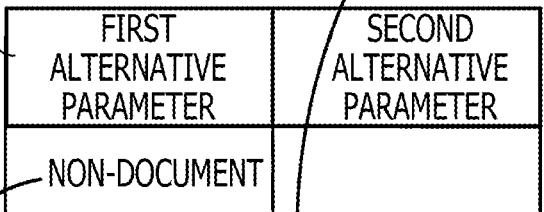

In S910, the 32 retrieves the first alternative parameter from the memory 35. For example, as shown in FIG. 21B, the CPU 32 retrieves the data type "NON-DOCUMENT" changed in S503 as the first alternative parameter 361 from the memory 35.

Figure 21C:
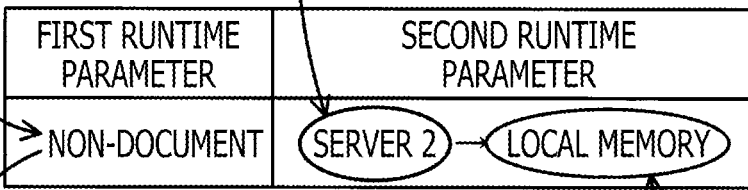
Figure 21D:
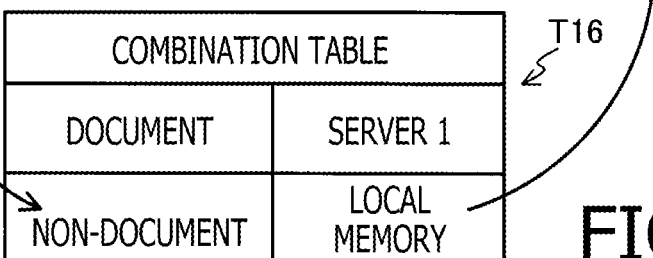

In S913, the CPU 32 set the runtime parameter by combining the second default parameter and the first alternative parameter 361. It is noted that the operation to set the runtime parameter shown in FIG. 21C is similar to the operation in S713.

In S920, the CPU 32 determines whether there exists a combination table including the first alternative parameter which was temporarily stored in S503. It is noted that the operation in S920 is similar to the operation in S720. When it is determined that there exists a combination table including the first alternative parameter stored in S503 (920: YES), the CPU 32 advances the control to S930. When it is determined that there does not exist a combination table including the first alternative parameter stored in S503 (920: NO), the CPU 32 terminates the subroutine of "STORAGE DESTINATION SETTING CHANGING PROCESS" shown in FIG. 8 and advances the control to S620.

In S930, the CPU 32 changes the second runtime parameter set in S913 in accordance with the combination table including the first alternative parameter. It is noted that the operation of changing the second runtime parameter in S930 is similar to the operation of changing the first runtime parameter executed in S730. After execution of S930, the CPU 32 terminates the subroutine of "STORAGE DESTINATION CHANGING PROCESS" shown in FIG. 8, and returns the control to S620 of FIG. 5A. It is noted that, in the "STORAGE DESTINATION CHANGING PROCESS" described above, an example in which the data type is used as the first runtime parameter, and the storage destination is used as the second runtime parameter is described. It is noted that similar operations may be executed when other parameters (e.g., scan color setting, scan color resolution) are used.

In S620, the CPU 32 determines whether K=N. When it is determined that K=N (S620: YES), the CPU 32 terminates the subroutine of "WORKFLOW EXECUTION PROCESS" shown in FIG. 6, and advances the control to S90 of FIG. 2. Otherwise (S620: NO), the CPU 32 advances the control to S630.

In S630, the CPU 32 counts up the value of K by one. After execution of S630, the CPU 32 returns the control to S510.

As an example of the "WORKFLOW EXECUTION PROCESS" described above, a case where the workflow WF2" shown in FIG. 18 is selected in S490 will be described. In this example, the CPU 32 executes the scanning process and the storing process (i.e., N=2) in this order. Concretely, the CPU 32 executes, in the "WORKFLOW EXECUTION PROCESS", S490, S500, S503 and S505. Thereafter, the CPU 32 determines that the first process is the scanning process in S510, and executes S550-S565. Then, in S620, the CPU 32 advances the control to S630 since K=1 (S620: NO). After execution of S630, the CPU 32 returns the control to S510. At second execution of S510, the CPU 32 determines that the second process is the storing process, and executes S570-S605. Thereafter, in S620, the CPU 32 determines that K=N (i.e., K=N=2) (S620: YES), and the CPU 32 terminates the subroutine of the "WORKFLOW EXECUTION PROCESS".

As another example of the "WORKFLOW EXECUTION PROCESS", a case where the workflow WF1" shown in FIG. 18 is selected in S490 will be described. In this case, the CPU 32 executes the scanning process and the printing process (i.e., N=2) in this order. Concretely, the CPU 32 executes, in the "WORKFLOW EXECUTION PROCESS", S490, S500, S503 and S505. Thereafter, the CPU 32 determines that the first process is the scanning process in S510, and executes S550-S565. Then, in S620, the CPU 32 advances the control to S630 since K=1 (S620: NO). After execution of S630, the CPU 32 returns the control to S510. At second execution of S510, the CPU 32 determines that the second process is the printing process, and executes S520-S530. Thereafter, in S620, the CPU 32 determines that K=N (i.e., K=N=2) (S620: YES), and the CPU 32 terminates the subroutine of the "WORKFLOW EXECUTION PROCESS".

FIG. 2 will be described further. When it is determined that the normal execution process is determined (S40: NORMAL PROCESS), the CPU 32 executes the normal execution process in S80. The normal execution process is to execute the functions implemented to the MFP 51 (e.g., the printing process, the scanning process and the like). Since the normal execution process is similar to the workflow registration process (see FIGS. 3 and 4) with omitting S170-S180, detailed description of the normal execution process will be omitted.

In S90, the CPU 32 determines whether the processing program 60 is to be terminated. When it is determined that the processing program 60 is to be terminated (S90: YES), the CPU 32 terminates the processing program 60 based on the OS 61, thereby terminate the series of programs. When it is determined that the processing program 60 is to be kept executed (S90: NO), the CPU 32 returns the control to S20.

<Effects of Illustrative Embodiment>

The MFP 51 stores the image data process (e.g., the printing process, the scanning process and the like) which has been executed in response to input of the user operation and the default parameters (e.g., print resolution, data type and the like) for the respective image data processes in the associated manner (S170). Further, when the workflow is stored, the CPU 32 sets the stored default parameters to the corresponding process of the image data processes (S180). That is, when the image data process is stored as the combination process, the parameters once stored can be diverted. Accordingly, it is not necessary to set the parameters, and the user's operability is improved. Further, when the MFP 51 executes the stored workflow, the MFP 51 obtains the alternative parameters at the runtime of the workflow corresponding to the image data process (S710, S810, S910). When the alternative parameters are different from the default parameters, the MFP 51 executes the image data process in accordance with the alternative parameters instead of the default parameters (S730, S830, S930). As above, even if the parameters for the image data process have been changed, the MFP 51 can executes the workflow with use the appropriate parameters.

The MFP 51 receives input of the alternative parameters of the image data process when the stored workflow is executed (S503), and sets the runtime parameter based on the received alternative parameters (S713). That is, the parameters to be used when the stored workflow is executed can be set. Accordingly, it is possible to execute each piece of the image data process of the workflow as stored, parameters different from the stored parameters.

When the second alternative parameters obtained when the workflow is executed do not coincide with the default parameters (S720: YES), the MFP 51 changes the first alternative parameters corresponding to the second alternative parameters based on the combination table (S720). Similarly, when the first alternative parameters obtained when the workflow is executed do not coincide with the default parameters (S820: YES, S920: YES), the MFP 51 changes the second alternative parameters corresponding to the first alternative parameters based on the combination table (S830, S930). As above, in accordance with the combination tables, the run time parameters of the workflow can be set automatically and appropriately.

When the first default parameter, which is associated with the printing process of the workflow retrieved from the workflow storage area 62, is the "NON-DOCUMENT" and the first alternative parameter obtained when the workflow is executed is "DOCUMENT", the MFP 51 determines to use the "DOCUMENT" as the first runtime parameter of the workflow (S813). Then, the MFP 51 changes the print resolution, which is the second runtime parameter of the workflow, to the resolution (i.e., 600 dpi) corresponding to "DOCUMENT" (S830). As above, the MFP 51 can execute the workflow with changing the print resolution based on the data type of the image data which is the process object.

When the first default parameter, which is associated with the storing process of the workflow retrieved from the workflow storage area 62, is the "NON-DOCUMENT" and the first alternative parameter obtained when the workflow is executed is "DOCUMENT", the MFP 51 determines to use the "DOCUMENT" as the first runtime parameter of the workflow (S913). Then, the MFP 51 changes the storage destination which is the second runtime parameter of the workflow to the storage destination corresponding to "DOCUMENT" (i.e., the "SERVER 2") (S930). As above, the MFP 51 can execute the workflow with changing the storage destination based on the data type of the image data which is the process object.

When the first default parameter, which is associated with the printing process of the workflow retrieved from the workflow storage area 62, is "COLOR" and the first alternative parameter obtained when the workflow is executed is "MONOCHROMATIC", the MFP 51 determines to use the "MONOCHROMATIC" as the first runtime parameter of the workflow (S813). Then, the MFP 51 changes the print color setting which is the second runtime parameter of the workflow to "MONOCHROMATIC" (S830). As above, the MFP 51 can execute the workflow with changing the print color setting based on the color setting of the image data which is the process object.

When the first default parameter, which is associated with the printing process of the workflow retrieved from the workflow storage area 62, is the "ONE SHEET" and the first alternative parameter obtained when the workflow is executed is "MULTIPLE SHEETS", the MFP 51 determines to use the "MULTIPLE SHEETS" as the first runtime parameter of the workflow (S813). Then, the MFP 51 changes the one-side/both-side print setting which is the second runtime parameter of the workflow to "BOTH-SIDE PRINTING" corresponding to the "MULTIPLE SHEETS" (S830). As above, the MFP 51 can execute the workflow with changing the one-side/both-side print setting based on the number of pages of the image data which is the process object.

When the first default parameter, which is associated with the scanning process of the workflow retrieved from the workflow storage area 62, is the "SERVER 2" and the first alternative parameter obtained when the workflow is executed is "LOCAL MEMORY", the MFP 51 determines to use the LOCAL MEMORY" as the second runtime parameter of the workflow (S713). Then, the MFP 51 changes the scan resolution which is the first runtime parameter of the workflow to "1200 dpi" corresponding to the "LOCAL MEMORY" (S830). As above, the MFP 51 can execute the workflow with changing the scan resolution based on the storage destination of the image data which is the process object.

When the image data including an image of a particular character string indicating a confidential document is the process object, the MFP 51 receives user input of setting a password with respect to the image data. Then, the MFP 51 set the received password to the image data (S565). As above, a password can be set to the image data in which confidential matter is written.

The MFP 51 stores user ID information to identify the user who stored the workflow in association with the stored workflow (S180). Then, when the workflow is executed, the MFP 51 acquires input of the user ID information to identify the user who inputted an execution instruction (S20). When the user ID information associated with the workflow does not coincide with the received user ID information (S580: NO), the MFP 51 receives the second alternative parameter representing the storage destination of the image data which is the process object, and changes the runtime parameter from the second default parameter associated with the storage process of the workflow to the received second alternative parameter. When the user who registered the workflow and the user who execute the workflow are different, the storage destination of the image data can be changed without changing the combination of a series of image data processes. Accordingly, the combination of the workflow registered by a particular user can be diverted.

It is noted that the above-described configuration is only an illustrative embodiment, and does not limit the aspects of the disclosures. Various modifications of the above-described configuration should be included in the aspects of the disclosures.

It is noted that an obtaining mode of the first alternative parameter need not be limited to the input by the user operation. For example, the first alternative parameter may be obtained by analyzing image data generated by the scanner 20. Concretely, for example, when the scanning process is executed in S560, the generated image data is analyzed and whether the data type is "DOCUMENT" or "NON-DOCUMENT" is determined. Then, when the thus determined data type is different from the first default parameter set to the workflow retrieved in S490, the determined parameter (e.g., the data type, the number of pages, and the like) may be temporarily stored in the memory 35 as the first alternative parameter.

When the workflow is executed, if the runtime parameters are changed in the print setting changing process, the scan setting changing process, the storage destination changing process (S730, S830, S590, S930), the default parameters of the workflow to be executed may be overwritten by the changed parameters and stored in the workflow storage area 62.

The parameters of respective data processes stored in S120-S140 need not be limited to the above-described ones. For example, as one of the storage setting stored in S140, transmission destination information such as an mail address, an SNS address may be used. In such a case, pre-defined sentences corresponding to respective transmission destinations may be set. For example, "first transmission destination" indicating a first transmission destination may be associated with a first pre-defined sentence, while "second transmission destination" indicating a second transmission destination may be associated with a second pre-defined sentence. Specifically, when the "first transmission destination information" is set as the second default parameter in S140 and input of the "second transmission destination" is acquired as the second alternative parameter in S503, a pre-defined sentence associated with the "second transmission destination information" may be set as the runtime parameter. Further, in the above case, as the runtime parameter, a user operation to set another pre-defined sentence, which is different from the second pre-defined sentence associated with the "second transmission destination information" may acquire. It is noted that setting of the pre-defined sentences to be associated with the transmission destination information may be done by prompting the user to select from among sentences registered in the memory 35 in advance, or done by acquiring the input by the user operation to input a character string.

Further, as one of the storage settings stored in S140, the data size of the image data which is the process object and the transmission method thereof. Concretely, when the image data is transmitted by e-mail, the transmission method of the image data may be changed depending on the data size of the image data. For example, then when the data size of the image data is less than a particular size (e.g., 1 Megabytes), the imaged data may be directly attached to the transmitted e-mail (i.e., a mail-attached transmission). When the data size of the image data is equal to or greater than the particular size, the image data may be stored in the server, and an URL, which is a storage destination of the image data, may be indicated in the e-mail to be transmitted (i.e., URL-indicated transmission), so that the user, who is the destination of the e-mail, can download the image data. As an example, when a storage settings of the data size being "less than 1 MB" and the transmission method being the "mail-attached transmission" are stored, and a storage rule which is a combination of the data size being "1 Mbytes or greater" and the transmission method being the "URL-indicated transmission" is stored, the CPU 32 may set the "URL-indicated transmission" as the runtime parameter when the input of "1 Mbyte or greater" is received as the alternative parameter in S503.

In S170, when the setting rule to be registered conflicts the previously stored setting rule, the CPU 32 overwrites the previously stored setting rule. However, aspects of the disclosures need not be limited to such a configuration. For example, a screen allowing the user to select the rule to be employed on the panel 39, and the selected rule may be stored as the setting rule. Alternatively, both conflicting rules may be stores as setting rules.

When the same setting rules are included in the combination table, the CPU 32 displays a screen allowing the user to select a rule when the workflow is executed on the panel 39 in S490, and the rule selected by the user may be applied to the workflow to be executed. Concretely, for example, if a combination of the first alternative parameter "DOCUMENT" and the second alternative parameter "1200 dpi" is registered in the combination table T13 shown in FIG. 14, there exist two kinds of the print resolutions "600 dpi" and "1200 dpi" for the "DOCUMENT". In such a case, when the obtained first alternative parameter is "DOCUMENT", a screen allowing the user to select "600 dpi" or "1200 dpi" on the panel 39, and the setting rule is set by receiving the input of the user operation to select one of "600 dpi" and "1200 dpi".

It is noted that the rule stored in the combination table need not be limited to a combination of two parameters, but the number of the parameters may be three re greater. For example, in addition to a combination of "DOCUMENT" and "600 dpi" in area R11 of the combination table T11 shown in FIG. 12, a parameter of a sheet size (e.g., "A3", "A4") may be added. For example, there is assumed a case where scan settings of the default parameters "DOCUMENT", "A4" and "600 dpi" are stored in S130, and a combination of "DOCUMENT", "A3" and "300 dpi" are stored as scan rule 1 in S170. In such a case, when "DOCUMENT" and "A3" are input as the alternative parameters in S503, the runtime parameter of the sheet size may be changed from "A4" to "A3" in accordance with the alternative parameter, and the runtime scan resolution may be changed from "600 dpi" to "300 dpi" in accordance with the scan rule 1.

The workflow registration process in S50 of FIG. 2 may be omitted, and the workflow may be registered by executing S160-S180 (FIGS. 3-4) after the normal execution process in S80. In this case, the determination "IS REGISTRATION COMPLETED?" in S160 may be replaced with "TO BE REGISTERED AS A WORKFLOW?". Further, when the determination in S160 is negative, the CPU 32 may advance the control to S90 instead of S100.

It is noted that the K-th image data process in S510 need not be limited to the scanning process, the printing process and the storing process. For example, an operating process may be included in the determination of the K-th image data process. The operating process is a process other than the printing process, the scanning process or the storing process, and includes, for example, a print preview displaying process of the image data, a displaying process to open and display the image data, and the like.

It is noted that the image data may be generated by imaging using imaging elements, or sensing with use of magnetic sensors or contact sensors.

A step of receiving the user ID information (S20) may be omitted. The normal execution process (S80) may be omitted. Further, a step of storing the user ID information (S178) may be omitted. The password setting process (S565) may also be omitted. Therefore, in general, the MFP 51 may execute a "first storing process", a "combination execution process", a "first obtaining process", a "first combination execution process", and a "second combination execution process". Concretely, the MFP 51 may execute at least S162, S163 or S164, S170, S180, S70, one of S710, S810, S910, S730, S830, S590 and S930, S520-S530, or S600-S605, and S550-S560.

It is noted that the technique elements described/shown in the specification and/or drawings exhibit, individually or in various combinations, technical utility, and the combination need not be limited to the combinations described in the originally filed disclosures. Further, the technique disclosed in the specification and/or drawings is configured to achieve a plurality of objects at the same time, and has the technical utility by achieving one of the plurality of objects.

The MFP 51 is an example of an image processing apparatus. The button 38 and the panel 39 are examples of a user interface. The printer 19, the scanner 20, the wireless LAN I/F 36 are examples of image data processing hardware.

The printing process, the scanning process, the storing process are examples of image data process. The scanning process, the retrieving process are examples of first image data process. The printing process, the storing process, the email transmission process are examples of second image data process.

The execution order information is an example of first identification information. The execution order information is an example of second identification information. The data type, the number of pages, the data size, the scan resolution, the scan color are examples of first default parameters. Further, the print resolution, the print color setting, the one-side/both-side print setting, the storage destination, the transmission destination are examples of second default parameters. The combination tables T11-T15 are examples of process combination information. The workflow is an example of a combination process. The data type, the number of pages, the data size, the scan resolution, the scan color setting are examples of first alternative parameters.

The print resolution, the print color setting, the one-side/both-side print setting, the storage destination, the transmission destination are examples of second alternative parameters. The combination tables T11-T15 are examples of parameter combination information. The data type, the number of pages, the data size, the scan resolution, the scan color setting are example of characteristics.

The server 110 is an example of an external memory. The wireless LAN I/F 36 is an example of a communication interface.

It is noted that S170 and S180 executed by the CPU 32 are examples of the first storing process. S70 is an example of the combination execution process. S710, S810, S910 and S590 are example of a first obtaining process. S520-S530, S600-S605 are examples of first combination execution process. S550-S560 are examples of a second combination execution process. S170 is an example of a second storing process. S565 is an example of a displaying process. S565 is an example of a receiving process. S180 is an example of a third storing process. S20 is an example of an identification information obtaining process. S580 is an example of a comparing process. S71 is an example of a second obtaining process.

What is claimed is:

1. A non-transitory computer-readable medium storing computer readable instructions for a control device having a controller, a user interface and a memory, the instructions being configured to, when executed by the controller, causes the control device to:
   in response to receipt of an execution operation through the user interface, cause image data processing hardware corresponding to image data process identified by the execution operation to execute the image data process identified by the execution operation in accordance with a parameter identified by the execution operation, the image data processing hardware being one of a plurality of kinds of image data processing hardware connected to the control device, the plurality of kinds of image data processing hardware including first image data processing hardware operable to perform a first image data process and second image data processing hardware operable to perform a second image data process different from the first image data process;
   store process combination information, which includes first identifying information indicating the first image data process, second identifying information indicating the second image data process, a first default parameter, and a second default parameter, in the memory, the first image data process being an image data process identified by a first execution operation of the execution operation and being process of preparing image data, the second image data process being the image data process identified by a second execution operation of the executed operation which is different from the first execution operation and being an operation using the image data prepare in the first image data process, the first default parameter being a parameter corresponding to the first image data process and being a parameter identified by the first execution operation, the second default parameter being a parameter corresponding to the second image data process and being a parameter identified by the second execution operation; and
   in response to receipt of a combination execution operation through the user interface, execute a combination process of causing the first image data processing hardware to execute the first image data process indicated by the first identification information included in the process combination information stored in the memory, and causing the second data processing hardware to execute the second image data process indicated by the second identification information using the image data prepared in the first image data process as object image data,
   the combination process including:
   a first obtaining process of obtaining an alternative parameter during the combination process, the alternative parameter including at least one of a first alternative parameter corresponding to the first image data process and a second alternative parameter corresponding to the second image data process;
   a first combination execution process of causing the first image data processing hardware to execute the first image data process in accordance with the first alternative parameter when the first alternative parameter is obtained in the first obtaining process and causing the first image data processing hardware to execute the first image data process in accordance with the first default parameter when the first alternative parameter is not obtained in the first obtaining process; and
   second combination execution process of causing the second image data processing hardware to execute the second image data process in accordance with the second alternative parameter when the second alternative parameter is obtained in the first obtaining process and causing the second image data processing hardware to execute the second image data process in accordance with the second default parameter when the second alternative parameter is not obtained in the first obtaining process.

2. The non-transitory computer readable medium according to claim 1,
   wherein the first alternative parameter is a parameter identified by the first execution operation, and
   wherein the second alternative parameter is a parameter identified by the second execution operation.

3. The non-transitory computer readable medium according to claim 1,
   wherein, when an alternative user operation is received through the user interface during the combination process, a parameter indicated by the alternative user operation is obtained, in the first obtaining process, as the alternative parameter.

4. The non-transitory computer readable medium according to claim 1,
   in the first obtaining process, the alternative parameter is obtained based on characteristics of image data prepare in the first image data process which is executed in the combination process.

5. The non-transitory computer readable medium according to claim 1,
   wherein, when the first alternative parameter obtained in the combination process is different from the first default parameter, the second alternative parameter corresponding to the obtained first alternative parameter and different from the second default parameter is obtained in the first obtaining process.

6. The non-transitory computer readable medium according to claim 1,
   wherein the memory is configured to store parameter combination information indicating a combination of the first alternative parameter and the second alternative parameter corresponding to the first alternative parameter, and
   wherein, in the first obtaining process, the second alternative parameter is obtained based on the parameter combination information stored in the memory when the first alternative parameter obtained during the combination process is different from the first default parameter.

7. The non-transitory computer readable medium according to claim 1,
wherein, when the first execution operation and the second execution operation are received through the user interface, the instructions, when executed by the controller, causes the control device to execute a second storing operation to store the first default parameter in the memory as the first alternative parameter, and the second default parameter in the memory as the second alternative parameter corresponding to the first alternative parameter.

8. The non-transitory computer readable medium according to claim 4,
wherein, when the first image data process executed in the combination process is a process of generating image data by obtaining characteristics of an object with used of a sensor, characteristics of an object image obtained with user of the sensor is analyzed and the alternative parameter is obtained based on a result of the analysis in the first obtaining process.

9. The non-transitory computer readable medium according to claim 1,
in the first obtaining process,
when the first default parameter is a parameter used to prepare the document image data which is image data containing character string image,
when non-document data which is image data not containing the character string image is prepared in the first image data process executed in the combination process, a parameter used to prepare the non-document data is obtained as the first alternative parameter,
when the first default parameter is the parameter used to prepare the non-document data,
when the document image data is prepared in the first image data process executed in the combination process, a parameter used to prepare the document image data is obtained as the first alternative parameter.

10. The non-transitory computer readable medium according to claim 9,
wherein, in the first obtaining process,
when the first default parameter is a parameter used to prepare the document image data,
when a parameter used to prepare the non-document image data is obtained as the first alterative parameter in the combination process, a parameter used to apply the second image data process to the non-document image data at a first resolution is obtained as the second alternative parameter,
when the first default parameter is a parameter used to prepare the non-document image data,
when a parameter used to prepare the document image data is obtained as the first alternative parameter in the combination process, a parameter used to apply the second image data process to the document image data at a second resolution which is lower than the first resolution is obtained as the second alternative parameter.

11. The non-transitory computer readable medium according to claim 9,
wherein the plurality of types of image data processing hardware includes a communication interface capable of communication with an external memory,
wherein the second image data process is a process of storing the image data prepared in the first image data process,
wherein, in the first obtaining process,
when the first default parameter is the parameter used to prepare the document image data,
when a parameter used to prepare the non-document image data is obtained as the first alterative parameter in the combination process, a parameter used to store the image data in the memory of the image processing apparatus is obtained as the second alternative parameter,
when the first default parameter is the parameter used to prepare the non-document image data,
when a parameter used to prepare the document image data is obtained as the first alterative parameter in the combination process, a parameter used to store the image data in the external memory is obtained as the second alternative parameter.

12. The non-transitory computer readable medium according to claim 1,
wherein, in the first obtaining process,
when the first default parameter is a parameter used to prepare monochromatic image data,
when color image data is prepared in the first image data process executed in the combination process, a parameter used to prepare the color image data is obtained as the first alternative parameter,
when the first default parameter is a parameter used to prepare the color image data,
when monochromatic image data is prepared in the first image data process executed in the combination process, a parameter used to prepare the monochromatic image data is obtained as the first alternative parameter.

13. The non-transitory computer readable medium according to claim 12,
wherein the second image data process is a process of printing the image data prepared in the first image data process,
wherein, in the first obtaining process,
when the first default parameter is a parameter used to prepare the monochromatic image data,
when a parameter used to prepare the color image data is obtained as the first alternative parameter in the combination process, a parameter used to perform color printing of the color image data as the second alternative parameter,
when the first default parameter is a parameter used to prepare the color image,
when a parameter used to prepare the monochromatic image data is obtained as the first alternative parameter in the combination process, a parameter used to perform monochromatic printing of the monochromatic image data is obtained as the second alternative parameter.

14. The non-transitory computer readable medium according to claim 13,
wherein, in the first obtaining process,
when the first default parameter is a parameter used to prepare one piece of image data,
when a plurality of pieces of image data are prepared in the first image data process executed in the combination process, a parameter used to prepare the plurality of pieces of image data is obtained as the first alternative parameter,
when the first default parameter is a parameter used to prepare the plurality of pieces of image data,
when the one piece of image data is prepared in the first image data process executed in the combination process, a parameter used to prepare the one piece of image data is obtained as the first alternative parameter.

15. The non-transitory computer readable medium according to claim 14,
wherein the second image data process is a process of printing the image data prepared in the first image data process,
wherein, in the first obtaining process,
when the first default parameter is a parameter used to prepare the one piece of image data,
when a parameter used to prepare the plurality of pieces of image data is obtained as the first alternative parameter in the combination process, a parameter used to perform the both-side printing of the plurality of pieces of image data as the second alternative parameter,
when the first default parameter is a parameter used to prepare the plurality of pieces of image data,
when a parameter used to prepare the one piece of image data is obtained as the first alternative parameter in the combination process, a parameter used to perform the one-side printing of the one piece of image data is obtained as the second alternative parameter.

16. The non-transitory computer readable medium according to claim 1,
wherein the plurality of types of image data processing hardware includes a communication interface configured to communicated with an external memory,
wherein the instructions, when executed by the controller, cause the control device to:
when the second default parameter is a parameter indicating that the image data is to be stored in the memory of the control device,
when the image data is to be stored in the external memory, which is a second storage, in the second image data process executed in the combination process, obtain a parameter indicating storage of the image data in the second storage as the second alternative parameter,
when the second default parameter is a parameter indicating that the image data is to be stored in the first storage,
when the image data is to be stored in the first storage in the second image data process executed in the combination process, execute a second obtaining process of obtaining a parameter indicating storage of the image data in the first storage destination as the second alternative parameter.

17. The non-transitory computer readable medium according to claim 16,
wherein, in the second obtaining process,
when the second default parameter is a parameter indicating storage of the image data in the first storage destination,
when a parameter indicating storage of the image data in the second storage destination is obtained as the second alternative parameter in the combination process, a parameter used to perform the first image data process at a third resolution corresponding to the second storage destination is obtained as the second alternative parameter, and
when the second default parameter is a parameter indicating storage of the image data in the second storage destination,
when a parameter indicating storage of the image data in the first storage destination is obtained as the second alternative parameter in the combination process, a parameter used to perform the first image data process at a fourth resolution, which is higher than the third resolution, corresponding to the first storage destination is obtained as the second alternative parameter.

18. The non-transitory computer readable medium according to claim 1,
wherein, in the first obtaining process,
when the first default parameter is a parameter used to prepare first particular image data containing a particular character string,
when second particular image data which does not contain the particular character string is to be prepared in the first image data process executed in the combination process, a parameter used to prepare the second particular image data is obtained as the first alternative parameter, and
when the first default parameter is a parameter used to prepare the second particular image data,
when the first particular image data is to be prepared in the first image data process executed in the combination process, a parameter used to prepare the first particular image data is obtained as the first alternative parameter.

19. The non-transitory computer readable medium according to claim 18,
wherein the instructions, when executed by the controller, further causes the control device to:
when a parameter used to prepare the first particular image data is obtained as the first alternative parameter in the first obtaining process:
display a particular screen to receive input to set a password with respect to the first particular image data; and
receive input with respect to the particular screen as displayed, and
wherein, in the first obtaining process,
when an input with respect to the particular screen is received, the password of which input is received is included in the second alternative parameter.

20. The non-transitory computer readable medium according to claim 17,
wherein the instructions, when executed by the controller, further causes the control device to execute:
a third storing process of storing first user identification information in the memory in association with the process combination information stored in the memory in the first storing process;
an identification information obtaining process to obtain second user identification information identifying a user causing the control device to execute the first obtaining process to obtain the second alternative parameter; and
a comparing process to compare the first user identification information with the second user identification information,
wherein, in the first obtaining process,
when the second default parameter is a parameter indicating a first transmission destination corresponding to the first user identification information,
when the first user identification information stored in the third storing process and the second user identification information obtained in the identification information obtaining process are determined to coincide with each other in the comparing process, a parameter indicating the first transmission destination is obtained as the second alternative parameter, and when the first user identification information stored in the third storing process and the second user identification information obtained in the identification information obtaining process are determined not to coincide with each other in the comparing process, a parameter indicating a second transmission destination corresponding to the second user identification information is obtained as the second alternative parameter.

21. A control device comprising a controller, a user interface and a memory, the controller causes the control device to:

in response to receipt of an execution operation through the user interface, cause image data processing hardware corresponding to image data process identified by the execution operation to execute the image data process identified by the execution operation in accordance with a parameter identified by the execution operation, the image data processing hardware being one of a plurality of kinds of image data processing hardware connected to the control device, the plurality of kinds of image data processing hardware including first image data processing hardware operable to perform a first image data process and second image data processing hardware operable to perform a second image data process different from the first image data process;

store process combination information, which includes first identifying information indicating the first image data process, second identifying information indicating the second image data process, a first default parameter, and a second default parameter, in the memory, the first image data process being an image data process identified by a first execution operation of the execution operation and being process of preparing image data, the second image data process being the image data process identified by a second execution operation of the executed operation which is different from the first execution operation and being an operation using the image data prepare in the first image data process, the first default parameter being a parameter corresponding to the first image data process and being a parameter identified by the first execution operation, the second default parameter being a parameter corresponding to the second image data process and being a parameter identified by the second execution operation; and in response to receipt of a combination execution operation through the user interface, execute a combination process of causing the first image data processing hardware to execute the first image data process indicated by the first identification information included in the process combination information stored in the memory, and causing the second data processing hardware to execute the second image data process indicated by the second identification information using the image data prepared in the first image data process as object image data, the combination process including:

a first obtaining process of obtaining an alternative parameter during the combination process, the alternative parameter including at least one of a first alternative parameter corresponding to the first image data process and a second alternative parameter corresponding to the second image data process;

a first combination execution process of causing the first image data processing hardware to execute the first image data process in accordance with the first alternative parameter when the first alternative parameter is obtained in the first obtaining process and causing the first image data processing hardware to execute the first image data process in accordance with the first default parameter when the first alternative parameter is not obtained in the first obtaining process; and second combination execution process of causing the second image data processing hardware to execute the second image data process in accordance with the second alternative parameter when the second alternative parameter is obtained in the first obtaining process and causing the second image data processing hardware to execute the second image data process in accordance with the second default parameter when the second alternative parameter is not obtained in the first obtaining process.

22. A system comprising a controller, a user interface, a memory and a plurality of kinds of image data processing hardware including first image data processing hardware operable to perform a first image data process and second image data processing hardware operable to perform a second image data process different from the first image data process, the controller causes the system to:

in response to receipt of an execution operation through the user interface, cause image data processing hardware corresponding to image data process identified by the execution operation to execute the image data process identified by the execution operation in accordance with a parameter identified by the execution operation, the image data processing hardware being one of the plurality of kinds of image data processing hardware;

store process combination information, which includes first identifying information indicating the first image data process, second identifying information indicating the second image data process, a first default parameter, and a second default parameter, in the memory, the first image data process being an image data process identified by a first execution operation of the execution operation and being process of preparing image data, the second image data process being the image data process identified by a second execution operation of the executed operation which is different from the first execution operation and being an operation using the image data prepare in the first image data process, the first default parameter being a parameter corresponding to the first image data process and being a parameter identified by the first execution operation, the second default parameter being a parameter corresponding to the second image data process and being a parameter identified by the second execution operation; and in response to receipt of a combination execution operation through the user interface, execute a combination process of causing the first image data processing hardware to execute the first image data process indicated by the first identification information included in the process combination information stored in the memory, and causing the second data processing hardware to execute the second image data process indicated by the second identification information using the image data prepared in the first image data process as object image data, the combination process including:

a first obtaining process of obtaining an alternative parameter during the combination process, the alternative parameter including at least one of a first alternative parameter corresponding to the first image data process and a second alternative parameter corresponding to the second image data process;

a first combination execution process of causing the first image data processing hardware to execute the first image data process in accordance with the first alternative parameter when the first alternative parameter is obtained in the first obtaining process and causing the first image data processing hardware to execute the first image data process in accordance with the first default parameter when the first alternative parameter is not obtained in the first obtaining process; and second combination execution process of causing the second image data processing hardware to execute the second image data process in accordance with the second alternative parameter when the second alternative parameter is obtained in the first obtaining process and causing the second image data processing hardware to execute the second image data process in accordance with the second default parameter when the second alternative parameter is not obtained in the first obtaining process.

* * * * *

UNITED STATES PATENT AND TRADEMARK OFFICE
CERTIFICATE OF CORRECTION

PATENT NO. : 10,609,242 B2
APPLICATION NO. : 16/566215
DATED : March 31, 2020
INVENTOR(S) : Takafumi Yamada Page 1 of 1

It is certified that error appears in the above-identified patent and that said Letters Patent is hereby corrected as shown below:

On the Title Page

Page 2, Column 2, Line 10:
(56) References Cited: U.S. Patent Documents
Please delete "Nakamake" and insert -- Nakamaki -- therefore.

Signed and Sealed this
Tenth Day of November, 2020

Andrei Iancu
*Director of the United States Patent and Trademark Office*